US006800837B1

(12) United States Patent
Ichimura et al.

(10) Patent No.: US 6,800,837 B1
(45) Date of Patent: Oct. 5, 2004

(54) METHOD FOR QUANTUM INFORMATION PROCESSING AND QUANTUM INFORMATION PROCESSOR

(75) Inventors: Kouichi Ichimura, Yokohama (JP); Tetsufumi Tanamoto, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 347 days.

(21) Appl. No.: 09/714,193

(22) Filed: Nov. 17, 2000

(30) Foreign Application Priority Data

Nov. 18, 1999 (JP) ............................................ 11-328333
Nov. 10, 2000 (JP) ........................................ 2000-344273

(51) Int. Cl.[7] ................................................. G02F 3/00
(52) U.S. Cl. ................................... 250/214 R; 250/207
(58) Field of Search ............................ 250/221, 214 R, 250/214 VT, 207; 257/14, 9; 324/300, 304, 305, 312

(56) References Cited

U.S. PATENT DOCUMENTS 3,754,988 A * 8/1973 Barnes ......................... 216/22
5,371,388 A * 12/1994 Oda ............................ 257/194
6,298,180 B1 * 10/2001 Ho ............................... 385/15

FOREIGN PATENT DOCUMENTS

JP         10-254569          9/1998

OTHER PUBLICATIONS

Vitanov et al., Optics Communications, vol. 135, pp. 394–405, "Properties of Stimulated Raman Adiabatic Passage With Intermediate–Level Detunig", Feb. 15, 1997.*
Cirac et al., Physical Review Letters, vol. 74, No. 20, pp. 4091–4094, "Quantum Computations with Cold Trapped Ions", May 15, 1995.*

N. A. Gershenfeld, et al., Science, vol. 275, pp. 350–356, "Bulk Spin–Resonance Quantum Computation", Jan. 17, 1997.
A. Imamoglu, et al., Physical Review Letters, vol. 83, No. 20, pp. 4204–4207, "Quantum Information Processing Using Quantum Dot Spins and Cavity QED", Nov. 15, 1999.
P. Benioff, Physical Review Letters, vol. 48, No. 23, pp. 1581–1585, Quantum Mechnical Models of Turing Machines That Dissipate No Energy, Jun. 7, 1982.
R. P. Feynman, Foundations of Physics, vol. 16, No. 6, pp. 507–531, "Quantum Mechanical Computers", 1986.
D. Deutsch, Proc. R. Soc. Lond., vol. 400, pp. 97–117, "Quantum Theory, The Church–Turing Principle and the Universal Quantum Computer", 1985.
J. I. Cirac, et al., Physical Review Letters, vol. 74, No. 20, pp. 4091–4094, "Quantum Computations with Cold Trapped Ions", May 15, 1995.

(List continued on next page.)

*Primary Examiner*—David V. Bruce
*Assistant Examiner*—Chih-Cheng Glen Kao
(74) *Attorney, Agent, or Firm*—Oblon, Spivak, McClelland, Maier, & Neustadt, P.C.

(57) ABSTRACT

Physical systems, each having three energy levels, in the solid substance arranged in a resonator are provided in which two of three transitions are optically allowed and a qubit is expressed by either of quantum states of two levels constituting the remaining optically forbidden transition or by the superposition state thereof. Two physical systems selectively irradiated with two kinds of light, frequency difference thereof corresponding to a transition frequency of the optically forbidden transition for respective physical systems, thereby setting initial states. A two-qubit gate operation is performed by irradiating the two physical systems simultaneously with two kinds of light having frequencies resonant with the optically allowed transitions other than the transitions coupled through the common resonator mode, while increasing an intensity level of one of the two kinds of light and decreasing an intensity level of the other light between start time and finish time of the simultaneous irradiation.

19 Claims, 9 Drawing Sheets

OTHER PUBLICATIONS

Y. Nakamura, et al., Letters to Nature, vol. 398, pp. 786–788, "Coherent Control of Macroscopic Quantum States in a Single–Cooper–Pair–Box", Apr. 29, 1999.

K. Ichimura, et al., Physical Review A, vol. 58, No. 5, pp. 4116–4120, "Evidence for Electromagnetically Induced Transparency in a Solid Medium", Nov. 1998.

T. Pellizzari, et al., Physical Review Letters, vol. 75, No. 21, pp. 3788–3791, "Decoherence, Continuous Observation, and Quantum Computing: A Cavity QED Model", Nov. 20, 1995.

N. V. Vitanov, et al., Optics Communications, vol. 135, pp. 394–405, "Properties of Stimulated Raman Adiabatic Passage with Intermediate–Level Detuning", Feb. 15, 1997.

Solid State Quantum Computing Spectral Holes. M.S. Shahriar et al. Posted at www.lanl.gov Jul., 2000.

* cited by examiner

METHOD FOR QUANTUM INFORMATION PROCESSING AND QUANTUM INFORMATION PROCESSOR

CROSS-REFERENCE TO RELATED APPLICATIONS

This application is based upon and claims the benefit of priority from the prior Japanese Patent Applications No. 11-328333, filed Nov. 18, 1999; and No. 2000-344273, filed Nov. 10, 2000, the entire contents of which are incorporated herein by reference.

BACKGROUND OF THE INVENTION

The present invention relates to a method for quantum information processing using a solid-state element, and more particularly to relates a method for quantum information processing in which operation is optically performed and which can attain high scalability of quantum bits (qubits) and to a quantum information processor.

A new information processing method is proposed for performing information processing in quantum processes in which quantum states of an atom such as a ground state and an excited state are set so as to correspond to "0" and "1" and bits are expressed by using each quantum state $|0\rangle$ or $|1\rangle$ or a superposition state $\alpha|0\rangle+\beta|1\rangle$ their of (where $\alpha$ and $\beta$ are complex numbers). Quantum computers based on such quantum information processing are proposed and formulated by Bennioff (P. Bennioff, Phys. Rev. Lett., 48, 1581 (1992)), Feynman (R. P. Feynman, Found. Phys., 16, 507 (1986)), and Deutsch (Proc. Roy. Soc. London, Ser. A400, 96 (1985)), and are now popularly studied.

In a conventional computer (a classical computer), a bit carrying information takes a value of "0" or "1". On the contrary, a bit in the quantum computation can take a value of not only $|0\rangle$ or $|1\rangle$ but also their superposition state $\alpha|0\rangle+\beta|1\rangle$. Such a bit is called a quantum bit (qubit). In the quantum computation, a plurality of (N) qubits is simultaneously dealt with and the whole qubits are subjected to unitary transformation called a gate operation to perform computation. Since the N qubits simultaneously express $2^N$ numbers, it becomes possible to make $2^N$ parallel computations. Therefore, it is possible to make extremely rapid computations for a certain problem.

Thus, the quantum computer has a potential capacity exceeding that of the classical computer in quality and is expected as the future information processing technology and computing technology. However, it has been considered that it is extremely difficult to realize the quantum computer. This is because it is difficult in practice to retain the superposition quantum states during computations and prevent a change other than the intended change of states by the gate operation from occurring. Further, in the quantum computation, it is necessary to couple the qubits to each other with retaining quantum coherency, but this is also difficult.

However, so far, some physical systems which make it possible to realize the quantum computation are proposed, and recently, some experiments are demonstrated.

One example is a method using ion trap that is theoretically proposed by Cirac and Zoller (J. I. Cirac and P. Zoller, Phys. Rev. Lett., 74, 4091 (1995)). In this method, individual ions are separated from one another by a distance of the order of micrometer or more and held in an electromagnetic trap at extremely low temperatures, and electron excited levels and a collective vibrational level of the ions are used. The collective vibrational level is a vibrational excited state related to the center-of-mass motion of all of the ions and serves to couple individual ions, i.e., qubits. An independent ion in the trap is hard to receive unnecessary interaction from the external world, and can retain the superposition state for a long period of time, which is a major premise for the quantum computation. However, it is necessary to use a large-scale apparatus for the ion trap at extremely low temperatures and thus it is difficult to reduce the size of the element. Further, the qubit is distinguished based on the position of the ion and a spatially converged laser beam is irradiated to aim at the specified ion. Thus, since the processing operation is effected with the individual qubits distinguished from one another by selectively applying the laser beam to the specified ion, it is necessary to separate the ions by a distance of at least approximately the wavelength of light, and therefore the integration of the elements and the scalability of the qubits are restricted.

Proposal of an NMR quantum computer using a nuclear spin of an atom in a molecule as a qubit is known as another physical system which can be experimented (N. A. Gershenfeld, I. Chuang, Science, 275, 350 (1997)). In this method, a magnetic field is applied to molecules in a solution, thereby allowing energy levels of the nuclear spin to cause Zeeman splitting. Then, the computation is executed by operating the quantum state of the nuclear spin, i.e., the qubit by affecting a high-frequency electromagnetic field resonant with the split energy level. The degree of the Zeeman splitting is different depending on the types of atoms and also different depending on the position of the atom in the molecule even if the atoms are of the same type. Therefore, it becomes possible to select a nuclear spin resonant with the frequency of the high-frequency electromagnetic field and to operate a single qubit. In the NMR quantum computer, the computation up to three bits is demonstrated. However, in this method, since each molecule acts as one computer, there occurs a problem that the number of qubits cannot be freely increased.

The above two examples are most advanced researches at present in which experiments for a quantum gate operation and execution of a simple computation algorithm are performed. However, as described above, for practical computation, a problem occurs in the scalability of the qubits. Further, in the above examples, a single ion in a trap or a nuclear spin of a molecule in a solution is used as a qubit. However, it is desired to make quantum computation by use of solid-state qubits that can be easily dealt with and have an advantage in reduction in size and integration.

As a study for realizing the quantum computation using a solid-state element, an experiment of a qubit using a Josephson junction is known (Y. Nakamura, Yu. A. Paskin and J. S. Tsai, Nature, 398, 786 (1999)). Nakamura et al. have succeeded in creating a superposition state of two states different in the number of electrons by use of microelectrodes in superconductive states. However, in this case, an advanced fine fabricating process is required for formation of qubits and coupling between a plurality of qubits. Further, an effective method for coupling coherently a large number of qubits is not known.

In addition, it is proposed a method for executing a quantum computation in which a metal atom or a molecule is held in fullerene and the electron states of a $\pi$ electron of the fullerene are utilized as qubits (Fukumi et al., Jpn. Pat. Appln. KOKAI Publication No. 10-254569). In this method, the phenomenon is utilized that light frequencies for exciting the $\pi$ electron of respective fullerene molecules are different depending on the number of carbon atoms in the fullerene or the type of the metal atom or the molecule, and fullerene used as a qubit is selected according to the wavelength of irradiated light to perform a processing operation. In this method, the qubits are coupled by bonding the fullerene molecules with an organic cross-linking molecule. In other words, an artificial "molecule", in which the fullerene serves as an atom and the organic cross-linking molecule serves as the interatomic bond, is used instead of the molecule in the NMR computer. However, since a highly fine fabricating technology or synthesis process is required for coupling qubits in this method, it is considered difficult to attain scalability to a large number of qubits. Further, since two levels of the ground state and the excited state of the $\pi$ electron coupled through an allowed transition are utilized for a qubit, decoherence by relaxation is easily caused, and therefore difficulty is expected in retaining the superposition state for a sufficiently long time necessary for computation.

As described above, in a physical system such as a single ion in a trap or a molecule in a solution, it is possible to retain coherency for a long period of time and a simple gate operation has already been realized. However, the above physical systems are hard to handle compared with the solid substance and also have difficulty in reduction in size and integration as elements, and further the scalability of the qubits is low. On the other hand, in the solid-state element, since decoherence is rapidly caused because of the method for operating the qubits and a material constituting the qubits, it is difficult to maintain the superposition state. Further, it is necessary to couple qubits by use of a substance in the real space in the solid-state element, which requires an extremely fine fabricating technique and brings about difficulty in coupling a large number of qubits.

Under the above circumstances, conventionally, it is difficult to realize an element or an apparatus for quantum information processing, for example, a quantum computer.

BRIEF SUMMARY OF THE INVENTION

An object of the present invention is to provide a method for quantum information processing and a quantum information processor that is compact and practical and uses a large number of qubits, that can retain the superposition state for a sufficiently long decoherence time and that is almost free from decoherence other than intended change of states during the gate operation without requiring a difficult fine patterning process, chemical synthesis and a wiring by a crystal growth process.

A method for quantum information processing according to the present invention comprises:
providing physical systems arranged in a resonator, each physical system having three energy levels, two transitions of three transitions between the three levels being optically allowed, wherein a quantum bit of each physical system is expressed by either of quantum states of two levels constituting a remaining optically forbidden transition or by their superposition state, and wherein at least two physical systems are included, one transition of the optically allowed two transitions being different in transition frequency for respective physical systems, and the at least two physical systems being coupled quantum-mechanically through a common resonator mode;
irradiating one physical system selectively with two kinds of light, frequency difference thereof corresponding to a transition frequency of the optically forbidden transition of the physical system, thereby setting an initial state;
irradiating the other physical system selectively with two kinds of light, frequency difference thereof corresponding to a transition frequency of the optically forbidden transition of the other physical system, thereby setting an initial state; and
irradiating the two physical systems simultaneously with two kinds of light, the two kinds of light having frequencies resonant with the optically allowed transitions other than the transitions coupled through the common resonator mode, while increasing an intensity level of one of the two kinds of light and decreasing an intensity level of the other light between start time and finish time of the simultaneous irradiation, thereby exchanging the quantum states between the two physical systems.

In the method of the present invention, since the superposition state of the two levels, the transition between them being optically forbidden, are used as a qubit expressing information, decoherence caused by relaxation can be alleviated. In addition, since a technique referred to as adiabatic passage can be applied that enables to cause a change of superposition state of the lower two levels without excitation to the upper level for operating the qubit with utilizing two kinds of light, decoherence caused by relaxation from the upper level can be alleviated during a gate operation. Further, since a qubit to be operated is selected from physical systems coupled through a resonator mode according to the frequency of light, a large number of qubits can be integrated in a space of a wavelength order.

In the method of the present invention, atoms, ions, molecules or the like held in a solid substance can be used as physical systems. One transition of optically allowed two transitions is different in transition frequency for respective physical systems according to a surrounding local field such as a magnetic field and an electric field. For example, ions contained in a solid substance are used as physical systems and neighboring two levels generated by hyperfine structure splitting caused by a nuclear spin of each ion can be used as the above two energy levels. The solid physical system can be easily formed into an element.

In the method of the present invention, the physical systems are divided into a plurality of physical system groups each of which includes a plurality of physical systems whose transition frequencies are in a given range and the quantum states of the plurality of physical systems contained in each group may be collectively changed. In this case, since the plurality of physical systems expresses one qubit, a large read-out signal can be obtained and occurrence of an error can be suppressed.

In the method of the present invention, the physical systems are arranged in a resonator and the physical systems are quantum-mechanically coupled through a common resonator mode. In this case, the qubits can be coupled irrespective of the position of the physical systems in the solid substance. Therefore, it is unnecessary to use a difficult superfine process technique and also to form wires. The resonator may be provided outside the solid substance holding the physical systems. The resonator may be constituted by polishing the opposite surfaces of the solid substance. It is more preferable to constitute the resonator by forming multi-layered coatings on the opposite surfaces of the solid substance. The resonator formed of the multi-layered coatings is small and can enhance the coupling effect of the qubits. Further, in the present invention, it is possible to use a spherical or disk-like solid substance, to form a multi-layered coating on the curved surface thereof and to confine light inside the solid substance by total reflection.

In the present invention, the physical systems may be applied with a magnetic field or an electric field together with irradiation with light to utilize levels subjected to splitting by breaking degeneracy of the two levels constituting the optically forbidden transition. In this case, since the quantum states are retained with utilizing respective levels split by breaking degeneracy, the degree of freedom for quantum information processing can be improved.

In the method of quantum information processing according to the present invention, a computation is executed by combining changes of quantum states of a plurality of physical systems. For example, a computation can be executed by combining a controlled-NOT operation of two qubits and a one-qubit operation.

In the case of performing the one-qubit operation, two kinds of light that resonate with optically allowed two transitions of the physical system intended to change the quantum state may be selected. Alternatively, in the case of performing the one-qubit operation, it is preferably to select two kinds of light that do not resonate with any of optically allowed two transitions but two-photon resonate with a remaining optically forbidden transition. When the two kinds of light that two-photon resonate with the optically forbidden transition are selected, even if physical systems other than the physical system intended to perform the gate operation are present in levels resonant with the resonator mode, the gate operation can be performed without affecting such physical systems or qubits consisting of the physical systems other than a desired qubit.

In the present invention, in order to suppress influence of physical systems not utilized as qubits to the qubit to be operated, a preprocessing operation may be performed prior to the controlled-NOT operation to change the physical systems into the specific states by irradiating the physical systems with light having a frequency resonant with the optically allowed transitions while scanning the frequency thereof. In this case, assuming that a scanning range of a light frequency irradiated for the preprocessing is $\Delta v_{Bw}$, a central transition frequency of the $|0>-|1>$ transitions is $v_{01center}$, and an inhomogeneous width of the $|0>-|1>$ transitions is $\Delta v_{01inhomo}$, $\Delta v_{Bw}$ preferably be set smaller than a value obtained by subtracting half of $\Delta v_{01inhomo}$ from $v_{01center}$.

Further, the quantum states of the physical systems as the result of the computation can be read out by irradiating the physical systems with light and detecting the emissions of light from the physical systems. In this case, if the physical systems are irradiated with light resonant with one of the optically allowed two transitions not resonant with the resonator mode while scanning the frequency thereof, the result can be read out without influenced by the physical systems not utilized as the qubit. Note that the result read-out can be performed based on the transmission intensity of light applied to the physical systems.

A quantum information processor according to the present invention comprises: physical systems each having three energy levels, two transitions of three transitions between the three levels being optically allowed, wherein a quantum bit of each physical system is expressed by either of quantum states of two levels constituting a remaining optically forbidden transition or by their superposition state, and wherein at least two physical systems are included, one transition of the optically allowed two transitions being different in transition frequency for respective physical systems; a resonator provided around the physical systems and having a resonator mode that resonates with the other transition of the two transitions of the physical system which are optically allowed; and a light source and an optical system configured to irradiate the physical systems with two kinds of light.

The processor according to the present invention may comprise an electromagnet for applying a magnetic field to the physical systems so as to break degeneracy of levels. In the present invention, it is preferable that the optical system is configured to divide light from the light source into a plurality of optical paths, and that each optical path is provided with an acoustooptic device configured to control a frequency of the light from the light source and an electrooptic device configured to generate light pulse train. In such a configuration, data input, computation operation and result read-out are performed using the optical paths and by irradiating the physical systems with one or two kinds of light having desired frequencies. Further, it is preferable to constitute the light source and the optical system to apply light while scanning the frequency thereof. In addition, it is preferable to provide a photodetector for detecting light emitted from the physical systems due to light irradiation to the physical systems. The result of detection by the photodetector can be converted into electrical signals and recorded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A quantum information processing method of the present invention has the following major features.

(1) Physical systems each having three energy levels are used as qubits and, when the qubits are operated by use of light, a technique called adiabatic passage is used utilizing population trapping induced where two-wavelength light beams are applied to the three-level systems.

(2) Since a plurality of physical systems having different transition frequencies between the levels are used as qubits and a desired qubit is operated selectively by use of light having a frequency resonant with the transition frequency of the qubit, individual qubits can be independently operated.

(3) Physical systems are provided in a resonator and transitions of the respective qubits are coupled through a common resonator mode to realize a gate operation such as a controlled-NOT operation associated with the two or more qubits.

Further, in the present invention, it is possible to prevent signals of physical systems not used as qubits from being detected as noises by effecting a proper preprocessing operation prior to the gate operation.

Now, the present invention is described in more detail. In a method of the present invention, physical systems in a solid substance whose transition frequencies are inhomogeneously distributed can be effectively used as qubits as they are. In particular, a phase relaxation time of a nuclear spin of $Pr^{3+}$ in a $Y_2SiO_5$ crystal having substantially no nuclear spin is relatively long, and thus it is known that the superposition state of two levels generated by hyperfine structure splitting caused by the nuclear spin can be retained for several tens of microseconds under light irradiation at approximately 4K that can be reached by use of liquid helium at atmospheric pressure (K. Ichimura, K. Yamamoto and N. Gemma, Phys. Rev., A58, 4116 (1998)). The time for which the superposition state can be retained is a peculiarly long time in the solid substance.

Figure 1:
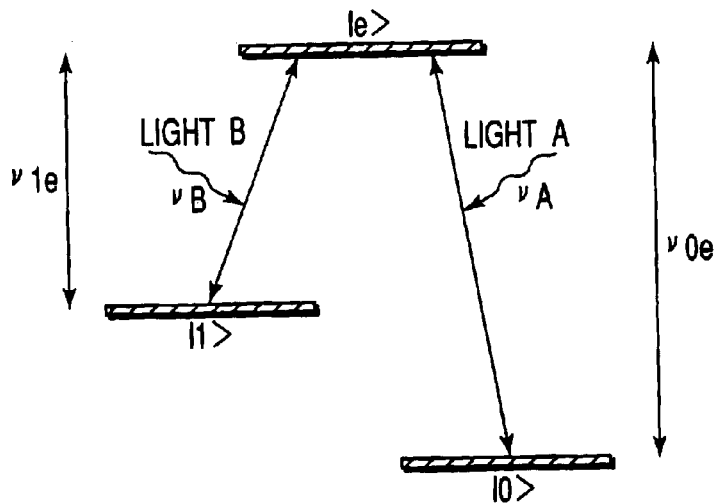
FIG. 1 is a view showing a condition where population trapping occurs when a three-level system is irradiated with two kinds of light.

As shown in FIG. 1, a physical system used in the present invention has three energy levels. These three energy levels are expressed by $|0>$, $|1>$ and $|e>$ in the order from the lowest energy level. In this case, it is assumed that $|0>-|e>$ transition and $|1>-|e>$ transition are optically allowed and $|0>-|1>$ transition is substantially optically forbidden. The above physical system is used as one qubit and information is expressed by either of lower two levels $|0>$ or $|1>$ or by their superposition state. The superposition state is expressed by the following expression (1).

$$\alpha|0>+\beta|1> \quad (\alpha, \text{ and } \beta \text{ are complex numbers}) \qquad (1)$$

Note that the quantum state of level $|0>$ or $|1>$ can be regarded as a special case of the superposition state.

In order to generate the above superposition state, light A having a frequency $\nu_A$ and light B having a frequency $\nu_B$ that respectively resonate with the transition frequency $\nu_{0e}$ of the $|0>-|e>$ transition and the transition frequency $\nu_{1e}$ of the $|1>-|e>$ transition are applied. The degree of interaction between the physical system and the light is expressed by a quantum $\nu_{Rabi}$ called a Rabi frequency. The Rabi frequency $\nu_{Rabi}$ depends on the transition dipole moment $\mu$ and the electric field intensity E of the light and is expressed by the following equation (2).

$$\nu_{Rabi} = \mu E/h \quad (h \text{ is a Plank's constant}) \qquad (2)$$

By irradiation of the light A and light B, levels $|0>$ and $|1>$ are superposed and the superposition state $|PT>$ expressed by the following equation (3) is generated.

$$|PT> = (\nu_{Rabi,0e}^2 + \nu_{Rabi,1e}^2)^{1/2} \cdot \nu_{Rabi,1e} |0> - (\nu_{Rabi,0e}^2 + \nu_{Rabi,1e}^2)^{-1/2} \cdot \nu_{Rabi,0e} |1> \qquad (3)$$

$\nu_{Rabi,0e}$ and $\nu_{Rabi,1e}$ in the equation (3) are expressed by the following equations (4) and (5).

$$\nu_{Rabi,0e} = \mu_{0e} \cdot E_A/h \qquad (4)$$

$$\nu_{Rabi,1e} = \mu_{1e} \cdot E_B/h \qquad (5)$$

where $\mu_{0e}$ is the transition dipole moment of the $|0>-|e>$ transition, $E_A$ is the electric field intensity of the light A, $\mu_{1e}$ is the transition dipole moment of the $|1>-|e>$ transition, and $E_B$ is the electric field intensity of the light B.

$|PT>$ in the equation (3) is referred to as a population trapping state or dark state. As indicated by the equation (3), the ratio of the superposition of the two states can be controlled by the Rabi frequency and therefore by the light intensity.

$|PT>$ in the equation (3) is an eigenstate of Hamiltonian that expresses the interaction between the light A, light B and the physical system.

$$H = h \cdot \nu_{Rabi,0e} |e><0| + h \cdot \nu_{Rabi,1e} |e><1| + h.c. \qquad (6)$$

where h.c. is an Helmitian conjugate.

In this state, even if light resonant with the transition from $<0|$ or $<1|$ to $<e|$ is present, the transition to $<e|$ does not occur.

Now, suppose that a state is adiabatically changed from $\nu_{Rabi,0e} << \nu_{Rabi,1e}$ to $\nu_{Rabi,1e} << \nu_{Rabi,0e}$ by applying light A and light B simultaneously with changing the intensities thereof. Applying the light A and light B simultaneously means that the application times of the light A and light B are superposed at least partly. The term "adiabatic" means that $|PT>$ can be regarded as being always in the eigenstate while the intensities of the light A and light B are being changed.

That is, the "eigenstate" |PT>(t) depending on time is expressed by the following equation (7) by use of the Rabi frequencies $v_{Rabi,0e}(t)$ and $v_{Rabi,1e}(t)$ depending on time.

$$|PT>(t)=(v_{Rabi,0e}(t)^2+v_{Rabi,1e}(t)^2)^{-1/2}\cdot v_{Rabi,1e}(t)\cdot|0>$$
$$-(v_{Rabi,0e}(t)^2+v_{Rabi,1e}(t)^2)^{-1/2}\cdot v_{Rabi,0e}(t)\cdot|1> \quad (7)$$

The physical system is not excited to the upper level |e> while the intensities of the light A and light B are being changed.

Figure 2:
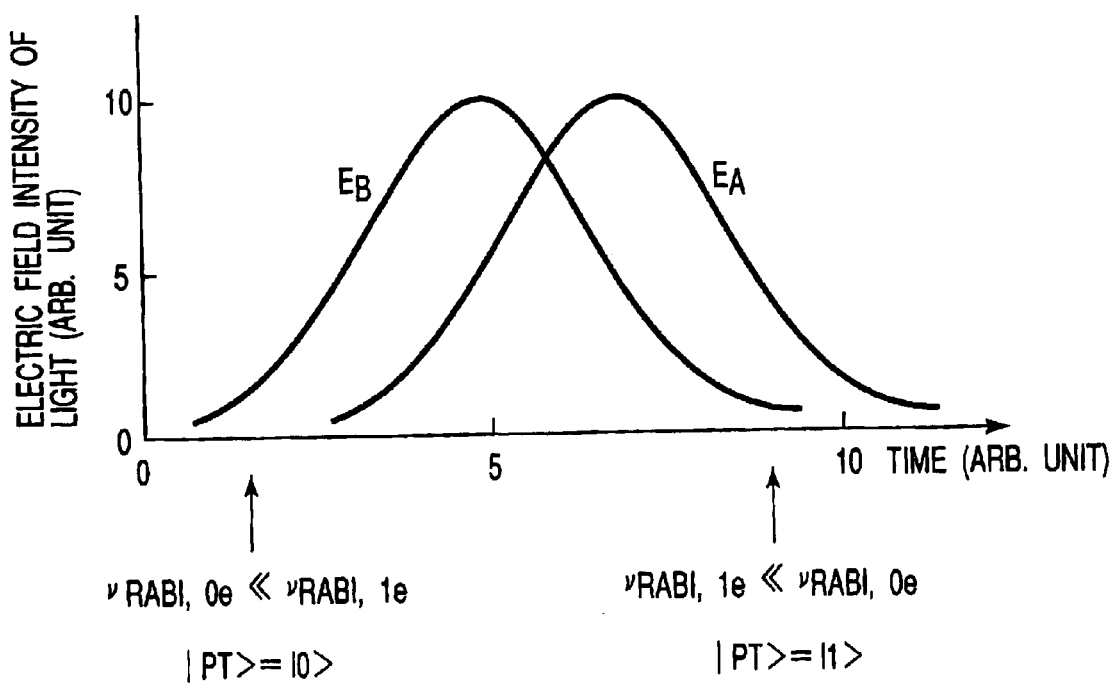
FIG. 2 is a diagram for illustrating a condition where adiabatic passage occurs by irradiation of two kinds of light.

FIG. 2 shows a change in the physical system at this time. As is clearly seen from the equation (7), the physical system that is initially in |PT>(t)=|0> is transferred to |PT>(t)=|1> after the change. Further, since the excitation to the upper level |e> does not occur during the change, the process of the state change of the physical system is not disturbed by a random process of spontaneous emission from |e>. The rate of a change in light intensities that can maintain the adiabatic condition depends on the light intensities. That is, if the light intensities are enhanced, the "adiabatic" change of state can be accelerated. By this method, the state of one qubit can be changed without disturbing the physical system. By this operation, a one-qubit gate operation can be performed.

Next, suppose a case where physical systems are distinguished from one another and each physical system is individually operated as one qubit. The above operation is indispensable to perform the quantum computation. In the following description, the qubits and physical systems corresponding thereto are distinguished from one another by use of a subscript i. For example, in a case where rare earth ions in a crystal are used for the quantum information processing or quantum computation, three energy levels of an i-th ion in the crystal are expressed as $|0>_i$, $|1>_i$ and $|e>_i$. Further, the transition frequencies of the $|0>_i$–$|e>_i$ transition, $|1>_i$–$|e>_i$ transition and $|0>_i$–$|1>_i$ transition of the i-th physical system are respectively expressed as $v_{0e,i}$, $v_{1e,i}$ and $v_{01,i}$.

In the present invention, physical systems having different transition frequencies are prepared, an i-th physical system is selected to perform the quantum gate operation. For example, in a case of the rare earth ions in the crystal, it is utilized that the transition frequencies of ions are distributed with a width called an inhomogeneous width. Two kinds of light A and light B having the frequencies $v_A$ and $v_B$ are applied to a solid in which such physical systems are present. In this case, the physical system having the transition frequencies of $v_{0e,i}=v_A$ and $v_{1e,i}=v_B$ is influenced by the light and brought into the population trapping state, and thus the quantum gate operation can be effected. In practice, in a transition frequency space in which the transition frequency $v_{0e}$ is taken on the horizontal axis and the transition frequency $v_{1e}$ is taken on the vertical axis, physical systems included in a certain range near ($v_A$, $v_B$) are influenced by the light and the gate operation can be effectively performed.

Figure 3:
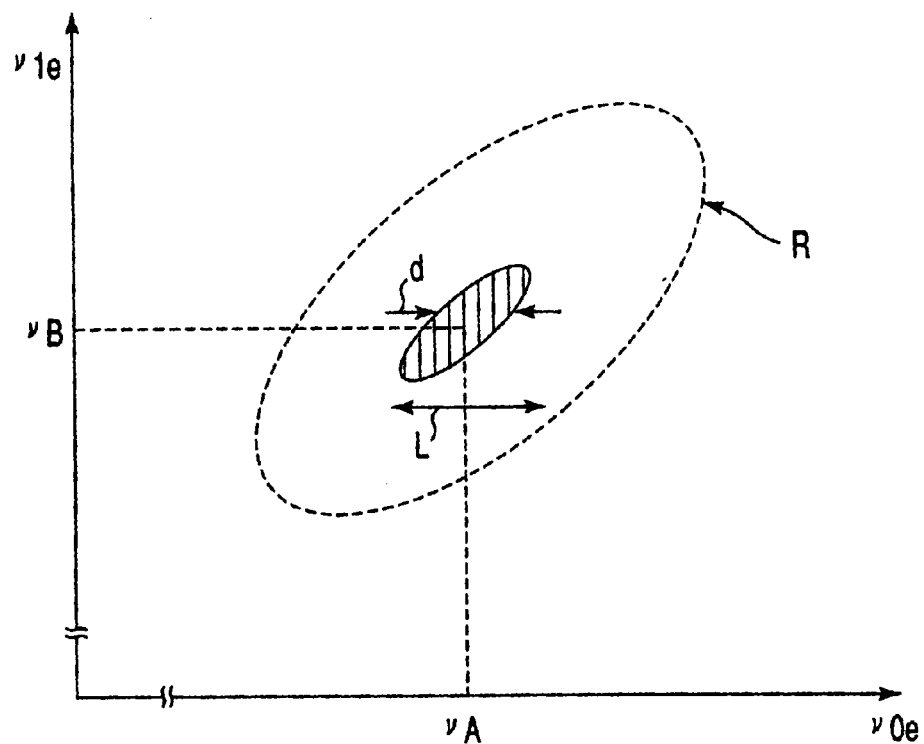
FIG. 3 is a diagram showing a region in the transition frequency plane where physical systems exist that cause population trapping by the interaction with the two kinds of light.

FIG. 3 shows, in the $v_{0e}$–$v_{1e}$ plane, a region R where the ions are distributed by dashed line and a range inside the region R where the physical system in which the quantum gate operation can be effected is present by solid line. The range is an elliptical area along a straight line passing through a point ($v_B$, $v_B$) expressed by the following equation (8).

$$v_{1e}=v_{0e}+v_B-v_A \quad (8)$$

In the area, the width d is approximately $(v_{Rabi,0e}^2+v_{Rabi,1e}^2)^{1/2}/2^{1/2}$ and the length L is approximately a homogeneous width of the |0>–|e> transition and the |1>–|e> transition.

If one physical system is contained in the area, one qubit is expressed by the quantum state of one physical system. Further, if physical systems are contained in the area, one qubit is expressed by the quantum state of one group of the whole physical systems. Therefore, if the physical systems distributed in the ($v_{0e}$–$v_{1e}$) plane are divided into groups having approximately the size of the area shown in FIG. 3 and each of the groups is used as a qubit, a qubit to be operated can be selected according to the frequency of irradiated light.

In order to perform the quantum information processing, particularly, the quantum computation by use of the qubits, it is necessary to quantum-mechanically couple the qubits and to perform the gate operation between the two qubits. In the present invention, coupling between the qubits is realized by arranging the physical systems in an optical resonator. The mechanism is explained below.

The physical systems in the resonator interact with the resonator. First, the interaction between one physical system and the resonator mode is considered. If the physical system has levels of optically allowed transition (allowed dipole transition), the interaction Hamiltonian between the transition dipole moment and the resonator mode resonant with the moment is expressed by the following equation (9). In this case, it is assumed that the dipole transition that interacts with the resonator mode is the <1|–<e| transition.

$$H=h/(2\pi)\cdot g\cdot c+|1><e|+h/(2\pi)\cdot g\cdot c|e><1| \quad (9)$$

In the equation (9), $c^+$ and c are respectively creation and annihilation operators of the resonator mode. Further, g is a coupling constant between the resonator mode and the physical system, which is expressed by the following equation (10).

$$g=-(2\pi)(\mu\cdot e\cdot E_C)/h \quad (10)$$

where $\mu$ is a transition dipole moment vector and e is a polarization vector of the resonator mode. $E_c$ is amplitude of a vacuum field of the given resonator mode, which is expressed by the following equation (11).

$$E_C=(h\cdot v_{cavity}/(2\epsilon_0\cdot V))^{1/2} \quad (11)$$

where $v_{cavity}$ is the frequency of the resonator mode, $\epsilon_0$ is the dielectric constant of vacuum and V is the volume of the resonator.

Figure 4:
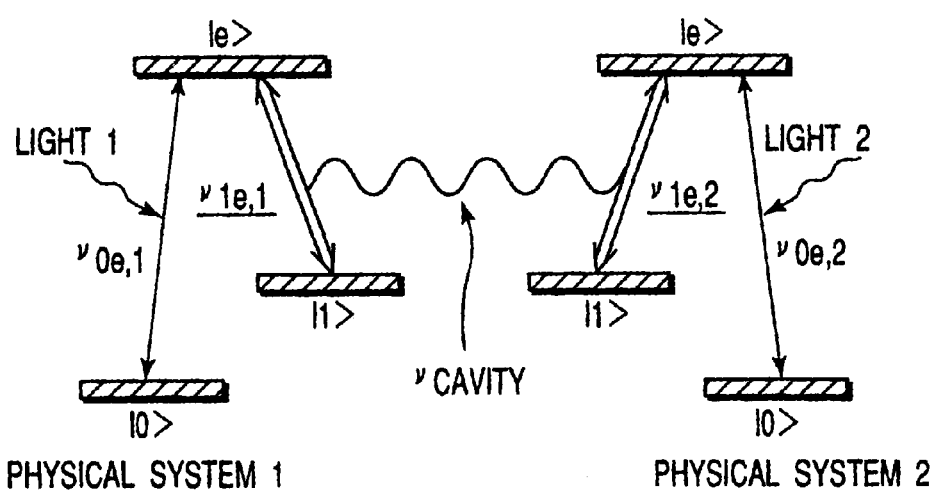
FIG. 4 is a view showing two physical systems, and a resonator mode acting on the two physical systems and two laser beams other than the resonator mode.

Next, a case where two physical systems are contained in the resonator is considered with reference to FIG. 4. It is assumed that respective transitions $v_{1e,1}$ and $v_{1e,2}$ of the two transitions in each of the two physical systems resonate with the resonator mode $v_{cavity}$. The physical systems are irradiated with light 1 and light 2 that respectively resonate with the remaining transitions, that is, $v_{0e,1}$ and $v_{0e,2}$.

At this time, Hamiltonian is expressed by the following equation (12).

$$H = \sum_{i=1}^{2} (h\cdot v_{Rabi,i}\cdot |0\rangle_{ii}\langle e| + h.c. + (h/(2\pi))\cdot g\cdot c^+|1\rangle_{ii}\langle e|+h.c.) \quad (12)$$

In this case, if a difference between the physical systems with respect to the dipole moments of the |0>–|e> transition and |1>–|e> transition can be neglected, $v_{Rabi,i}$ is expressed by the following equation (13).

$$v_{Rabi,i}=\mu_{0e}\cdot E_i/h \quad (13)$$

where $82_{0e}$ is the transition dipole moment of the |0>–|e> transition and $E_i$ is the electric field intensity of the light i.

Also, in this case, like the case where two kinds of light are applied to a single qubit, the "population trapping state" that is not excited to the upper level $|e>_i$ is present as the eigenstate of the equation (12). It is known that two eigenstates among them are expressed by the following equations (14) and (15).

$$|PT_0>=|1>_1|1>_2|n=0> \tag{14}$$

$$|PT_1>=N_1(v_{Rabi,2}\cdot g\cdot|0>_1|1>_2|n=0>+v_{Rabi,1}\cdot g\cdot|1>_1|0>_2|n=0>-(2\pi)\cdot v_{Rabi,1}\cdot v_{Rabi,2}\cdot|1>_1|1>_2|n=1>) \tag{15}$$

where $N_1$ is a normalization constant. Further, the third ket ($|>$) indicates the quantum state of the resonator mode that has a quantum number good for the number of photons.

A controlled-NOT operation, which is a two-qubit gate operation, can be effected by use of the "population trapping state". The controlled-NOT operation is an operation in which if the state of the control bit is "0" then a target bit is remained as it and if the state of the control bit is "1" then the target bit is inverted. The controlled-NOT operation is expressed as follows if the control bit is indicated on the left side and the target bit is indicated on the right side.

$$|0>|0> \rightarrow |0>|0>$$

$$|0>|1> \rightarrow |0>|1>$$

$$|1>|0> \rightarrow |1>|1>$$

$$|1>|1> \rightarrow |1>|0>$$

As one method of the controlled-NOT operation, a method proposed by Pellizzari et al. (T. Pellizzari, S. A. Gardiner, J. I. Cirac and P. Zoller, Phys. Rev. Lett. 75, 3788 (1995)) can be utilized. In this method, a series of single ions arranged in the ion trap are coupled through the resonator mode and spatially converged laser beams are applied to distinguish the individual ions and operate them, thereby performing a quantum computing. Next, the manner how the controlled-NOT operation is performed is explained by applying the above method.

In the method of Pellizzari et al., degenerated levels as $|0>$, $|1>$ and $|e>$ are used. In the following description, it is assumed that $|0>$, $|1>$ and $|e>$ are levels in which $|0>$ and $|0'>$, $|1>$ and $|1'>$, and $|e>$ and $|e'>$ are respectively degenerated. In the actual physical system, for example, it is utilized that levels generated by hyperfine structure splitting of rare earth ions in the crystal are degenerated.

Like the case of adiabatic passage of the single qubit, suppose a case where the Rabi frequency condition is changed from $v_{Rabi,1}<<v_{Rabi,2}$ to $v_{Rabi,2}<<v_{Rabi,1}$ by controlling the intensities of light applied to the two qubits. In this case, the "population trapping state" expressed by the equation (15) is changed as indicated by the following expressions (16) and (17). The operation has a function of exchanging the states of the physical system 1 and the physical system 2.

$$|PT_1>=|0>_1|1>_2|n=0> \rightarrow |1>_1|0>_2|n=0> \tag{16}$$

$$|0'>_1|1'>_2|n=0> \rightarrow |1'>_1|0'>_2|n=0> \tag{17}$$

The above method can also be applied in a case where physical systems coupled through the common resonator mode are considered, attention is paid to the k-th and l-th physical systems, laser beams resonant with $v_{0e,k}$ and $v_{0e,l}$ are selectively affected thereto, and the condition is changed from $v_{Rabi,k}<<v_{Rabi,l}$ to $v_{Rabi,l}<<v_{Rabi,k}$. That is, the exchanging operation expressed by the following expressions (18) and (19) can be effected between the k-th and l-th physical systems.

$$|PT_1>=|0>_k|1>_l|n=0> \rightarrow |1>_k|0>_l|n=0> \tag{18}$$

$$|0>_k|1'>_l|n=0> \rightarrow |1'>_k|0'>_l|n=0> \tag{19}$$

In order to effect the controlled-NOT operation between the k-th and l-th qubits as described above, the quantum states expressing the logic "0" and logic "1" are re-defined in the physical systems which carry the respective qubits. That is, the quantum states $|0(new)>_k$, $|1(new)>_k$, $|0(new)>_l$ and $|1(new)>_l$ that newly express "0" and "1" are defined by the following equations (20) to (23).

$$|0(new)>_k=|0>_k \tag{20}$$

$$|1(new)>_k=|1>_k \tag{21}$$

$$|0(new)>_l=|1>_l \tag{22}$$

$$|1(new)>_l=|1'>_l \tag{23}$$

As a result, if laser beams of $v_{0e,k}$ and $v_{0e,l}$ are applied and the condition is changed from $v_{Rabi,k}<<v_{Rabi,l}$ to $v_{Rabi,l}<<v_{Rabi,k}$, the four quantum states of $|0(new)>_k|0(new)>_l$, $|0(new)>_k|1(new)>_l$, $|1(new)>_k|0(new)>_l$ and $|1(new)>_k|1(new)>_l$ are transformed as indicated by the following equations (24) to (27).

$$|0(new)>_k|0(new)>_l=|0>_k|1>_l \rightarrow |1>_k|0>_l \tag{24}$$

$$|0(new)>_k|1(new)>_l=|0>_k|1'>_l \rightarrow |1>_k|0>_l \tag{25}$$

$$|1(new)>_k|0(new)>_l=|1>_k|1>_l \rightarrow |1>_k|1>_l \tag{26}$$

$$|1(new)>_k|1(new)>_l=|1>_k|1'>_l \rightarrow |1>_k|1>_l \tag{27}$$

Next, $|1>_l$ and $|1'>_l$ of the l-th physical system are exchanged with each other as indicated by the following expressions by irradiating light while applying an external field (magnetic field or electric field).

$$|1>_1 \rightarrow |1'>_1$$

$$|1>_1 \rightarrow |1'>_1$$

Finally, the states of the k-th and l-th physical systems are exchanged with each other by making a change from $v_{Rabi,l}<<v_{Rabi,k}$ to $v_{Rabi,k}<<v_{Rabi,l}$ in a reverse direction with respect to the first operation by controlling the intensities of two kinds of light.

The above series of operations can be summarized as indicated by the following equations (24') to (27').

$$|0(new)>_k|0(new)>_l=|0>_k|1>_l \rightarrow |1>_k|0>_l \rightarrow |1>_k|0>_l \rightarrow |0>_k|1>_l= |0(new)>_k|0(new)>_l \tag{24'}$$

$$|0(new)>_k|1(new)>_l=|0>_k|1'>_l \rightarrow |1>_k|0'>_l \rightarrow |1>_k|0'>_l \rightarrow |0>_k|1'>_l= |0(new)>_k|1(new)>_l \tag{25'}$$

$$|1(new)>_k|0(new)>_l=|1>_k|1>_l \rightarrow |1>_k|1>_l \rightarrow |1>_k|1'>_l \rightarrow |1>_k|1'>_l= |1(new)>_k|1(new)>_l \tag{26'}$$

$$|1(new)>_k|1(new)>_l=|1>_k|1'>_l \rightarrow |1>_k|1'>_l \rightarrow |1>_k|1>_l \rightarrow |1>_k|1>_l= |1(new)>_k|0(new)>_l \tag{27'}$$

As described above, using the k-th qubit as a control bit and the l-th qubit as a target bit, the controlled-NOT operation can be performed by controlling the intensities of two kinds of irradiated light.

The quantum information processing operation involves the computation can be effected by combining the above controlled-NOT operation and the one-qubit gate operation.

As described above, according to the present invention, the quantum information processing operation can be effected by selecting qubits by selecting a laser beam wavelength and effecting the one-qubit and two-qubit gate operations without requiring special wiring and fine process.

Next, a method for making the quantum information processing operation of the present invention more preferable is explained.

It is now considered that $|0>-|e>$ transition is made to resonate with the resonator mode. In this case, if the frequency of the common resonator mode is denoted by $v_{cavity}$, then a physical system that satisfies the following equation can be used as a qubit.

$$v_{0e,i} = v_{cavity}$$

Figure 5:
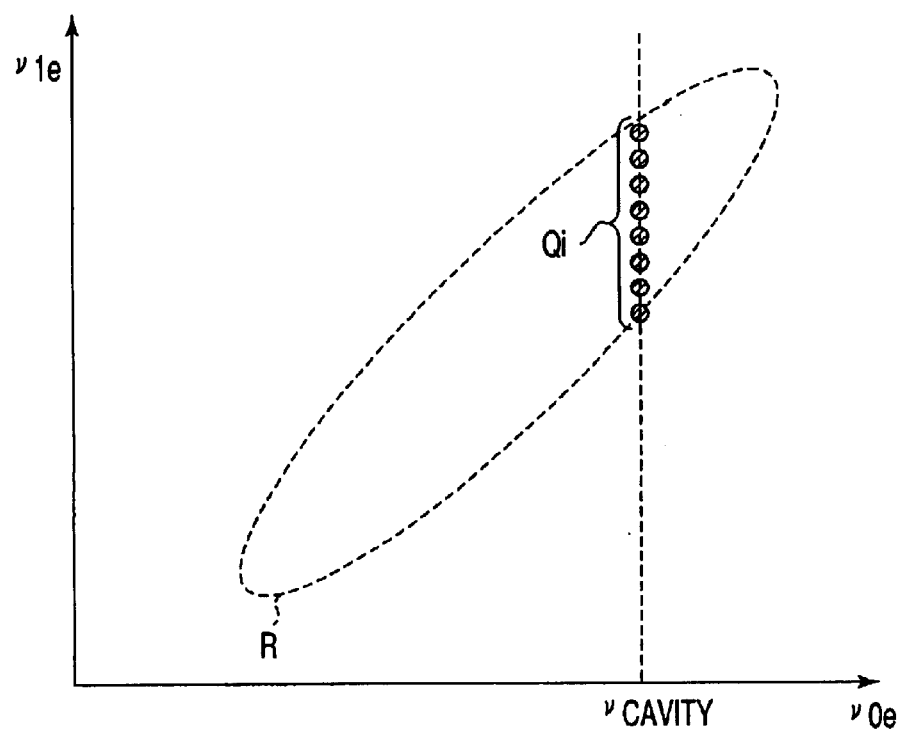
FIG. 5 is a diagram showing physical systems resonant with the resonator mode in the transition frequency plane.

The physical systems resonant with the resonator mode are shown in FIG. 5.

Then, it is considered that the one-qubit gate operation is effected for a k-th qubit of the physical systems satisfying the equation (7), which can used as qubits. In the above method, $(\alpha_k|0>_{q,k}+\beta_k|1>_{q,k})$ of the qubit is changed to $(\alpha_k|0>_{q,k}+\beta_k|1>_{q,k})$ by applying light beams with frequencies of $v_A = v_{0e,q,k}$ and $v_B = v_{1e,q,k}$.

Figure 6:
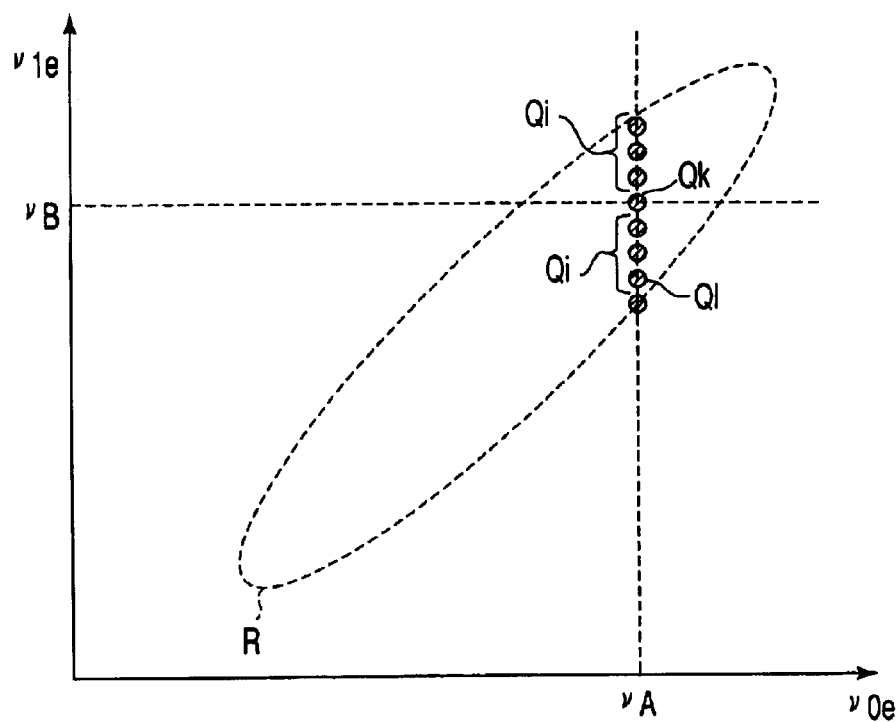
FIG. 6 is a diagram showing qubits other than the desired qubit that can be influenced in the transition frequency plane.

However, in the above method, there is a possibility that light beam applied so as to cause the k-th qubit to effect the one-qubit gate operation will resonate with other qubits $Q_i$ to cause a change. This situation is shown in FIG. 6. The fact that $v_A$ resonates with $v_{0e,q,k}$ means that it simultaneously resonates with the $|0>-|e>$ transition of other qubits. Therefore, for example, if the l-th ($l \neq k$) qubit $Q_l$ is in a state of $|0>_{q,l}$, the qubit is also influenced by the irradiated light and there is a possibility that the state is changed to $|1>_{q,l}$.

Figure 7:
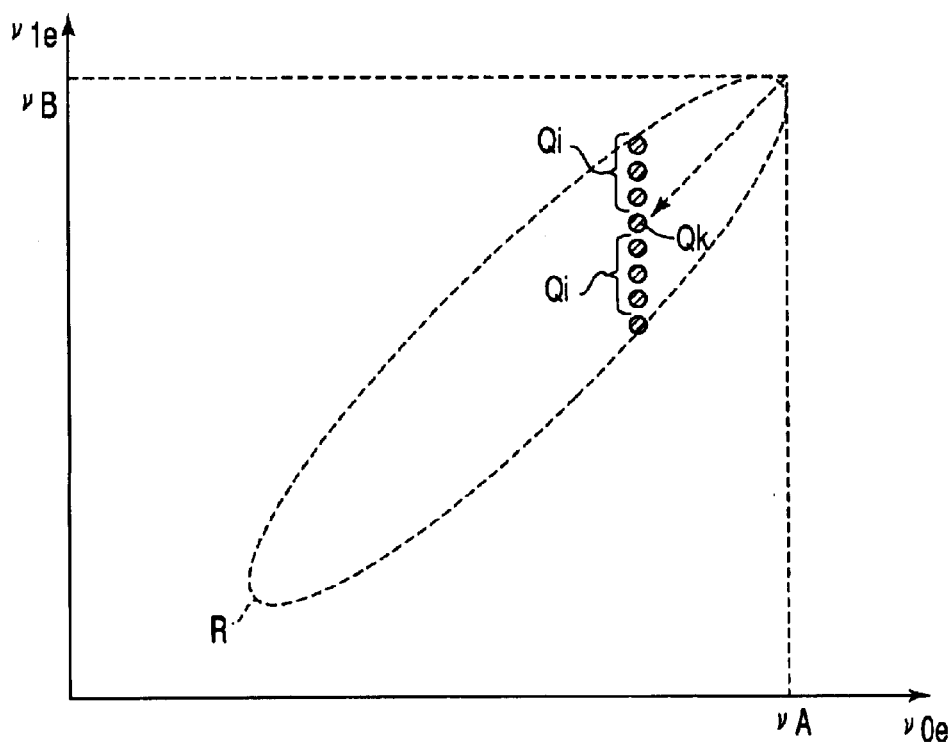
FIG. 7 is a diagram for illustrating the operation by using two kinds of light not causing one-photon resonance but causing two-photon resonance in the transition frequency plane.

In the present invention, in order to solve the above problem, two kinds of light A and light B having frequencies different from the frequencies used in the above explanation are irradiated. The aspect is shown in FIG. 7. The frequencies $v_A$ and $v_B$ of the light A and light B do not resonate with the transition frequency $v_{0e,q,k}$ of the $|0>-|e>$ transition and the transition frequency $v_{1e,q,k}$ of the $|1>-|e>$ transition, are separated from the transition frequencies by the homogeneous width $\Delta v_{homo}$ or more of the transition and two-photon resonate with the transition frequency $v_{01,q,k}$ of the $|0>-|1>$ transition. That is, these relations are expressed as follows.

$$v_A \leq v_{0e,q,k} - \Delta v_{homo}, v_A \leq v_{0e,q,k} + \Delta v_{homo}$$

$$v_B \leq v_{1e,q,k} - \Delta v_{homo}, v_B \leq v_{1e,q,k} + \Delta v_{homo}$$

$$v_A - v_A = v_{10,q,k}$$

By applying the two light A and light B, it is possible to suppress influence from being affected to qubits $Q_i$ other than the desired qubit $Q_k$ at the time of one-qubit operation. Further, it is known that adiabatic passage can also be made by application of light beams that do not one-photon resonate but two-photon resonate (N. V. Vitanov and S. Stenholm, Optics. Comm., 135, 394 (1997)).

Therefore, even if detuning occurs between $v_{0e,q,i}$ and $v_A$ and between $v_{1e,q,i}$ and $v_B$, it is possible to cause only a desired qubit to effect the one-qubit gate operation. For example, it is considered that light A and light B that are detuned by $\Delta v_{=vA} - v_{0e,i} = v_B - v_{1e,i}$ are applied to the k-th qubit. In this case, the superposition state (population trapping state) of $|0>_{q,k}$ and $|1>_{q,k}$ coupled by the two-photon resonance can be realized irrespective of occurrence of detuning. At this time, the coefficients $\alpha$ and $\beta$ of the superposition state can be controlled by the intensities of the light A and light B. Further, if the light A and light B are used as pulsed light and the irradiation timings thereof are adjusted while changing the intensity ratio thereof with time, it is possible to change the qubit by the adiabatic passage technique like the case without detuning.

In the present invention, the light A and light B that have proper detuning of a homogeneous width or more and are in a relation of two-photon resonance with only the desired k-th qubit are applied. In this case, the light A and light B neither two-photon resonate with other qubits nor one-photon resonate with the other qubits. Therefore, the influence on the other qubits by the light A and light B can be reduced to a negligibly low degree.

However, if the degree of detuning $\Delta v$ is increased to a certain value or more, it becomes no more possible to cause adiabatic change of state. In this case, the one-qubit gate operation cannot be effected after the light A and light B are applied. The upper limit detuning $\Delta v_{max}$ causing a change regarded as being adiabatic is determined by the intensities of the pulsed light beams and the time width of the pulse as follows when the delay between the two pulsed light beams is fixed (N. V. Vitanov and S. Stenholm, Optics. Comm., 135, 394 (1997)).

$$\Delta v_{max} = C_1 \times \Delta T \times v_0^2 \tag{28}$$

where $C_1$ is a constant determined by the shape of the pulse or the like, $\Delta T$ is a pulse width and $v_0$ is the pulsed light intensity. The pulsed light intensity $v_0$ is defined as follows. The pulses of the light A and light B are expressed as follows by use of the Rabi frequency depending on time.

$$v_A(t) = \frac{v_{Ac}}{\Delta T} f\left(\frac{t-\tau}{\Delta T}\right) \tag{29}$$

$$v_B(t) = \frac{v_{Bc}}{\Delta T} f\left(\frac{t+\tau}{\Delta T}\right) \tag{30}$$

where $2\tau$ is the delay time between the two pulses and f is a smooth function expressing the shape of the pulse. In this case, f takes a value defined as follows.

$$f(\pm\infty) = 0 \tag{31}$$

$$\int_{-\infty}^{+\infty} f(\chi) = 1 \tag{32}$$

Then, the pulsed light intensity $v_0$ is expressed as follows by use of $v_{Ac}$ and $v_{Bc}$.

$$v_0 = \sqrt{\frac{v_{Ac}^2 + v_{Bc}^2}{2}} \tag{33}$$

Therefore, even if the magnitude of detuning is large, the one-qubit gate operation can be effected by making the pulse time width $\Delta T$ long or by enhancing the pulsed light intensity $v_0$ so as to satisfy the condition of the adiabatic change.

In the quantum computation, as the gate operation time is shorter, the operation of a larger number of steps can be effected before the coherency of the system is lost, and therefore, it is convenient. Even if detuning occurs, the gate operation can be effected in a short time by enhancing the pulsed light intensities.

However, if the light intensities are enhanced to make the gate operation time short, there occurs a possibility that an influence of one-photon resonance caused by high-intensity light cannot be neglected even if detuning for the one-photon resonance is provided. In this case, however, it is possible to effectively perform only the one-qubit gate operation by the two-photon resonance and neglect the one-photon resonance if the detuning, pulse width and pulsed light intensity are properly set. This is explained below.

It is known that the absorption spectrum (the frequency distribution of the induced transition coefficient) $g_L(v)$ of individual atoms serving to optical absorption exhibit the Lorentz type expressed by the following expressions.

$$g_L(v) = C_2 \frac{\Delta v_{homo}}{(v - v_c)^2 + (\Delta v_{homo})^2} \quad (34)$$

where $C_2$ is a constant, $v_c$ is a central frequency of the spectrum and $\Delta v_{homo}$ is a homogeneous width of one-photon transition.

When $v_{Ac}=v_{Bc}=v_0$, the probability that an atom causes one-photon transition by application of light having detuning $\Delta v$, intensity $v_0$ and pulse width $\Delta T$ is considered. The probability is expressed by the following equation (35) when the magnitude of detuning is larger than the homogeneous width of the one-photon transition.

$$C_3 \times v_0^2 \times g_L(v_c + \Delta v) \times \Delta T \approx C_4 \times v_0^2 \times \frac{\Delta T}{\Delta v^2} \quad (35)$$

$$(\Delta v_{homo} << \Delta v)$$

On the other hand, in order to make the probability that an atom is transferred from the state $|0>$ to the state $|1>$ by two-photon resonance to a value in the order of 1, it is necessary to set the pulse width $\Delta T$ and pulsed light intensity $v_0$ that satisfy the relation expressed by the following equation (36) with respect to the detuning $\Delta v$. In this case, $C_5$ is a constant.

$$\Delta v = C_5 \times \Delta T \times v_0^2 \quad (36)$$

Therefore, in order to eliminate the influence of the one-photon transition on the two-photon resonance, the right side of the equation (35) is made much less than 1, and $\Delta v$, $\Delta T$, $v_0$ are so set as to satisfy the following equation (37) as indicated by the following equations.

$$C_4 \times v_0 \times \frac{\Delta T}{\Delta v^2} << 1 \quad (35')$$

$$\frac{C_4}{C_5^2} \times \frac{1}{\Delta T \times v_0^2} << 1 \quad (37)$$

That is, when certain detuning $\Delta v$ is set, it is only necessary to set $\Delta T$ and $v_0$ so as to satisfy the equation (37). The condition can be satisfied by enhancing $v_0$ even when $\Delta T$ is made small.

As described above, according to the method of the present invention, the one-qubit gate operation can be effected only by use of a qubit to be operated and an influence by one-photon resonance on the other qubits can be suppressed to a negligibly low degree.

Pellizzari et al. have proposed a method in which quantum information is stored in a degenerated level not resonant with the resonator mode when the computation is not performed, and the quantum information is transferred to a level resonant with the resonator mode at the time of individual gate operation and the quantum information is returned to the initial level after the gate operation is completed. In this method, when the gate operations are performed sequentially for every qubits, qubits other than the qubit performing the gate operation are not influenced. However, this method can not perform operation of another qubit when a certain qubit is operated or parallel operations in which two qubits are operated simultaneously. On the contrary, the method of the present invention can avoid influence of the operation to the other qubits other than the desired qubit as described above, even when such operations are performed.

The method of the present invention can also suppress influence from physical systems not used as qubits, as explained hereinafter.

Figure 8:
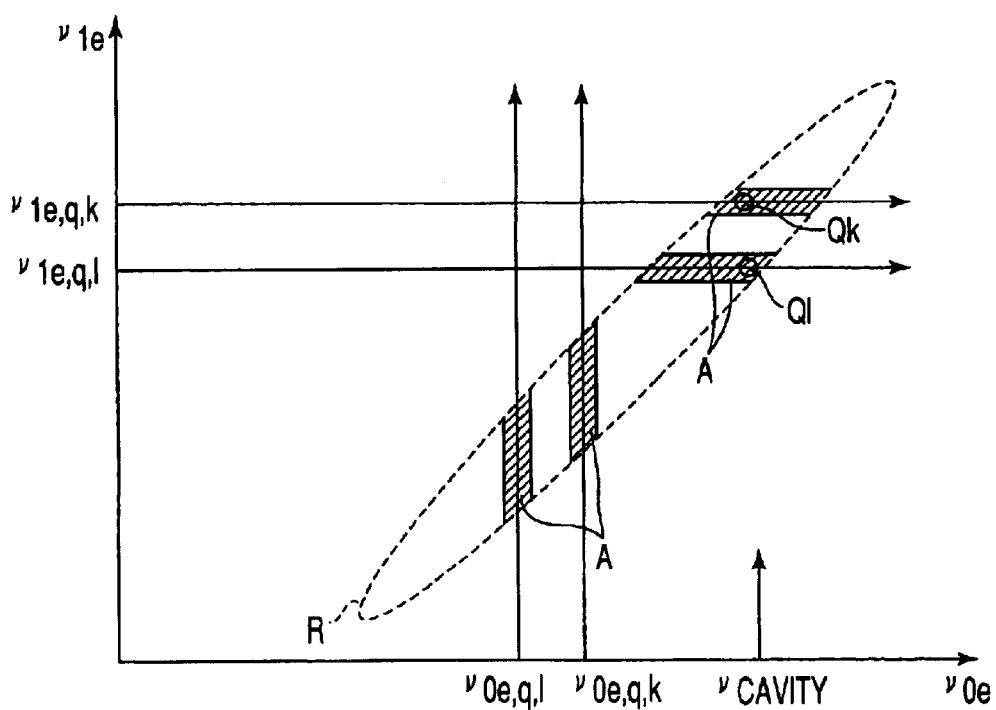
FIG. 8 is a diagram showing a region in the transition frequency plane where physical systems responsible for noise are distributed when the operation by two kinds of light is effected.

The method of the present invention is particularly effective when the central transition frequency of the $|0>-|1>$ transition is lower than homogeneous widths of the allowed transitions between $|0>$ and $|e>$ and between $|1>$ and $|e>$. FIG. 8 shows the relation between the frequencies of irradiated light and the distribution of physical systems in the transition frequency plane in the above case. Here, it is assumed that the $|0>-|e>$ transition resonates with the resonator mode. A case where light beams having two frequencies resonant with the $|1>-|e>$ transition frequencies $v_{1e,q,k}$ and $v_{1e,q,l}$ of k-th and l-th qubits is irradiated to effect the two-qubit gate operation is considered. At this time, since physical systems in a hatched area A having a homogeneous width in FIG. 8 resonate with the incident light beams, it becomes difficult to control the light intensities that act on the qubit to be operated. Further, at the time of reading-out of the states of the qubits by applying light having frequency $v_{1e,q,i}$ while changing sequentially the value i and detecting the presence or absence of fluorescence at the final stage of the computation, the physical systems in the area A emits fluorescence after they are excited, which disturbs correct read-out.

In the method of the present invention, before starting the operation, the states of the physical systems in the area A shown in FIG. 8 are changed so as to avoid the influence on the read-out after the qubit gate operation and the computation. This is explained with reference the relation between the irradiated light frequencies and the distribution of physical systems in the transition frequency plane shown in FIG. 9. Like the case of FIG. 8, in FIG. 9, it is assumed that the $|0>-|e>$ transition resonates with the resonator mode.

Figure 9:
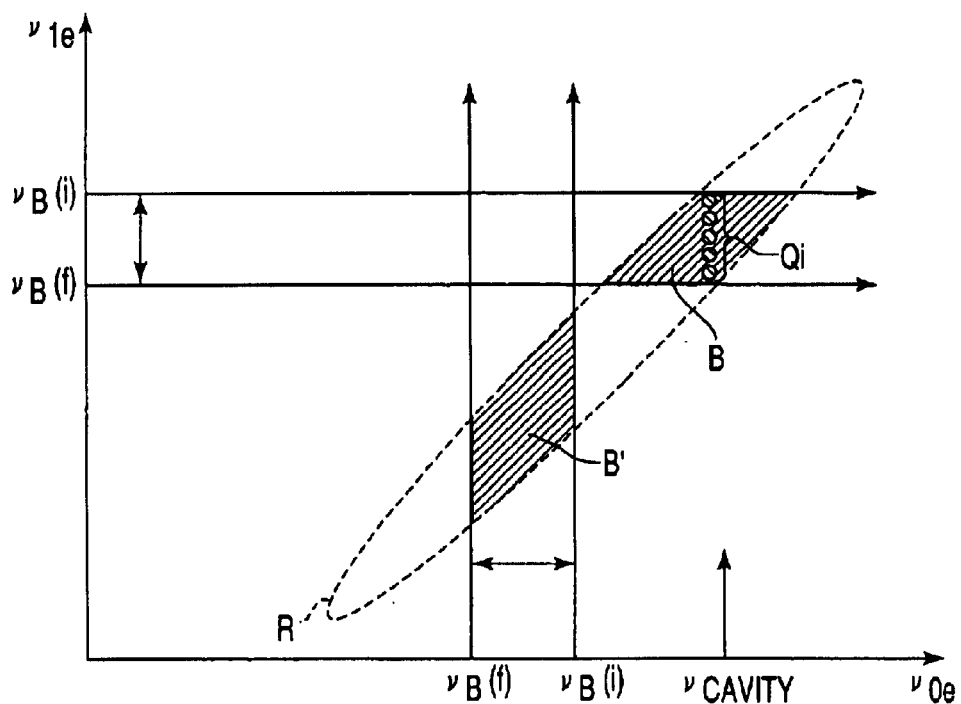
FIG. 9 is a diagram for illustrating the preprocessing operation in the transition frequency plane.

In this method, before starting the operation, light resonant with the $|0>-|e>$ transition is applied in a certain frequency range. As shown in FIG. 9, if light is applied while scanning the frequency in a range from $v_B(i)$ to $v_B(f)$, the states of physical systems in a hatched area B in FIG. 9 can be set to $|0>$. The area B is so set as to contain the area A shown in FIG. 8. Thereafter, only the states of the physical system used as a qubit is changed to a desired initial state by the one-qubit gate operation and then a series of gate operations are performed. Finally, light resonant with $v_{1e,q,i}$ is applied to read out the quantum state.

As shown in FIG. 9, light resonant with the $|1>-|e>$ transitions of the physical systems in the area B also resonates with the $|0>-|e>$ transitions of physical systems in a area indicated by B'. Therefore, if light is applied while scanning the frequency in a range from $v_B(i)$ to $v_B(f)$, the states of the physical systems in the area B are set to $|0>$ and the states of the physical systems in the area B' are set to $|1>$. As described above, for the two-qubit gate operation or result read-out, light resonant with the $|1>-|e>$ transitions of the qubits is irradiated. However, since the states of the physical systems in the area B are set to |0>, they do not absorb light resonant with the |1>–|e> transitions., In addition, the physical systems in the area Be also do not absorb light. Therefore, the physical systems not used as the qubits will not disturb execution of the two-qubit gate operation or result read-out.

However, if the above preprocessing is performed in order to eliminate the influence from the physical systems not used as the qubits, it is necessary to pay attention to the range of the light frequency scanned before the operation. This is explained with reference to FIG. 10.

Figure 10:
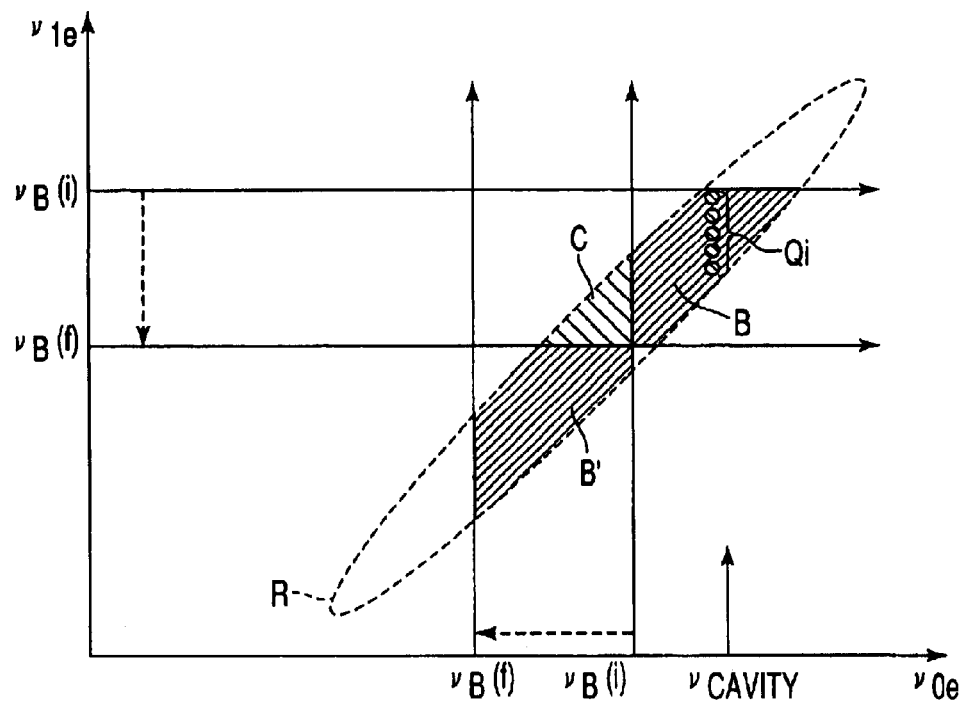
FIG. 10 is a diagram showing a proper scanning range of frequency in the transition frequency plane when the pre-processing operation is effected.

If the frequency scanning range of the applied light from $v_B(i)$ to $v_B(f)$ exceeds the |0>–|1> transition frequency, the states of physical systems existing in a region C shown in FIG. 10 are first changed to the state |1> and then returned to the state |0>. As a result, there occurs a possibility that such physical systems absorb light applied for operating a desired qubit during the computation operation.

In order to prevent the area C from being created, the frequency scanning width $\Delta v_{Bw} = v_B(i) - v_B(f)$ may be so set as to satisfy the following condition.

$$|v_B(i) - v_B(f)| < v_{01center} - \frac{\Delta v_{01inhomo}}{2} \qquad (38)$$

where $v_{01center}$ is the central transition frequency of the |0>–|1> transition and $\Delta v_{01inhomo}$ is inhomogeneous width (the width in the direction of $v_{0e}$ axis) of the |0>–|1> transitions in the string-like area in which the physical systems are distributed in a frequency plane.

If the frequency of applied light is scanned to satisfy the above relation, the physical systems not used as the qubits do not absorb light during the operation and can be prevented from disturbing the gate operation of the qubit and result read-out.

EXAMPLES

There will now be described embodiments of the present invention with reference to the accompanying drawings.

Embodiment 1

Figure 11:
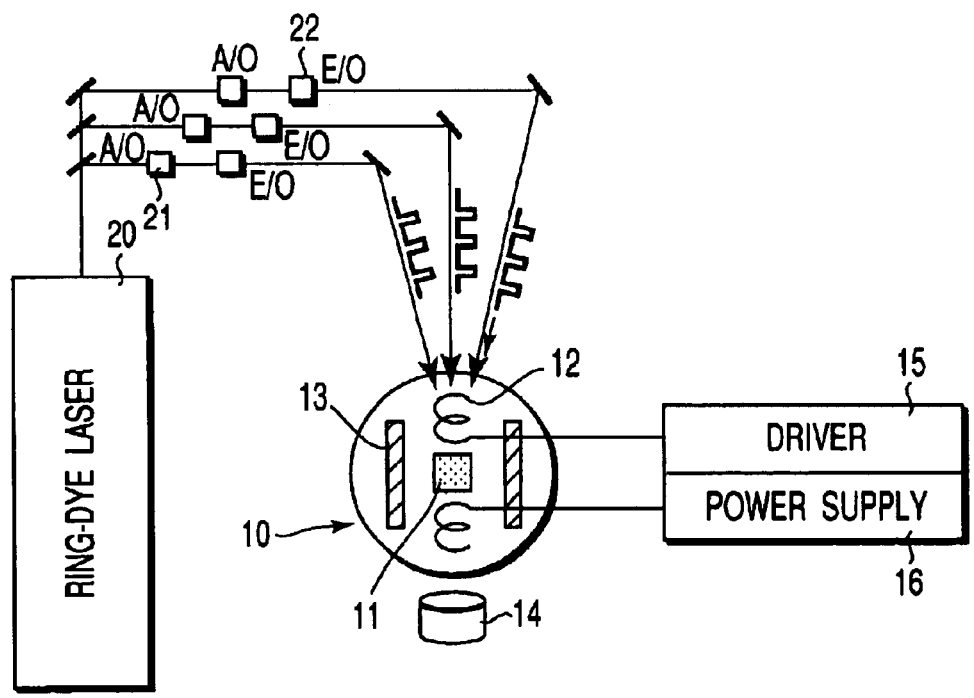
FIG. 11 is a view showing a quantum information processor used in the embodiments of the present invention.

The quantum information processor used in the following Embodiments will be described with reference to FIG. 11. A cryostat 10 is cooled with liquid helium supplied from a refrigerating machine (not shown). A resonator 13 is disposed in the cryostat 10, and a sample 11 is disposed in the resonator 13. Note that the resonator may be disposed outside the cryostat 10. Also, the resonator may be constituted by multi-layered coatings formed on the two surfaces of the sample 11. The sample 11 is applied with a magnetic field from two electromagnets (coils) 12. The coils 12 are connected to a pulse high frequency magnetic field driver 15 and static magnetic field applying power supply 16 that are disposed outside the cryostat 10. Light emitted form an argon ion laser pumped ring-dye laser 20 is divided into a plurality of optical paths by means of optical members. Each optical path is provided with an acoustooptic device 21 and electrooptic device 22. In each optical path, the frequency of the laser beam is controlled with the acoustooptic device 21 so as to resonate a transition frequency of a predetermined quantum bit, and a light pulse train is generated by means of the electrooptic device 22. Using the plurality of optical paths as described above, one or two or more light pulse trains are applied to the sample 11 in the cryostat 10. Further, a photodetector 14 is disposed outside the cryostat 10 for detecting emission from the sample 11 or transmitted light of the laser beam applied to the sample 11.

In this apparatus, the electrooptic device 22 is controlled with electric signals generated according to input data, programming for the gate operation or programming for result read-out. The pulse high frequency magnetic field driver 15 and static magnetic field applying power supply 16 are controlled with electric signals, if desired, thereby a static magnetic field and vibrating magnetic field are applied from the coils 12 to the sample 11. In this case, the sample is irradiated with the light pulse train synchronously with the application of the magnetic field to the sample. Further, the emission from the sample 11 is detected with the photodetector 14 at adequate timing.

An example of one-qubit operation using the apparatus shown in FIG. 11 will be described. As a sample, a $Y_2SiO_5$ crystal of 2 mm×2 mm×2 mm in which 0.05% of $Pr^{3+}$ ions are dispersed (which is obtained by replacing 0.05% of $Y^{3+}$ of $Y_2SiO_5$ by $Pr^{3+}$) is prepared. In this example, neighboring lower two levels |a> and |b> which belong to the lowest Stark level $^3H_4(1)$ and are generated by hyperfine structure splitting due to a nuclear spin of $Pr^{3+}$ in the crystal are utilized. The sample is placed in a cryostat and the temperature is kept at 1.4K. The wavelength of the laser beam A from the ring-dye laser is set to $v_A$ near 605.98 nm (16502.3 cm$^{-1}$) that resonates with the transition between the lowest $^3H_4(1)$ level and the $^1D_2(1)$ electron excitation level of $Pr^{3+}$ in the crystal. In addition, laser beam B having a frequency Of $v_B = v_A - 17.3$ MHz is generated by passing the above laser beam through the acoustooptic device.

First, the laser beam A with the intensity of 50 mW/cm$^2$ and the laser beam B with the intensity of 5 W/cm$^2$ are applied to the sample for 0.1 seconds or more, and immediately after this, only the laser beam A with the intensity of 5 mW/cm$^2$ is applied to the sample for 1 μs, and then the emission intensity is measured. Next, the laser beam A with the intensity of 50 mW/cm$^2$ and the laser beam B with the intensity of 5 W/cm$^2$ are applied to the sample for 0.1 seconds or more again, and immediately after this, only the laser beam B with the intensity of 5 mW/cm$^2$ is applied to the sample for 1 μs, and then the emission intensity is measured. As the result of this, the ratio of the first measured value of the emission intensity to the second measured value is approximately 3:1. This is because a part of the ions in a region simultaneously resonant with the light A and light B are brought into the superposition state of the lower two levels |a> and |b> of $^3H_4(1)$. The superposition state is expressed as follows by use of the Rabi frequencies $v_{Rabi,A}$ and $v_{Rabi,B}$ associated with the light A and light B.

$$(v_{Rabi,A}^2 + v_{Rabi,B}^2)^{1/2} \cdot v_{Rabi,B} |a> -$$

$$(v_{Rabi,A}^2 + v_{Rabi,B}^2)^{1/2} \cdot v_{Rabi,B} |b> -$$

Further, it is considered that most part of the ions that are not in the superposition state are transferred to the hyperfine structure levels that do not relate to the superposition state.

Embodiment 2

In this embodiment, a controlled-NOT operation will be described.

Figure 12:
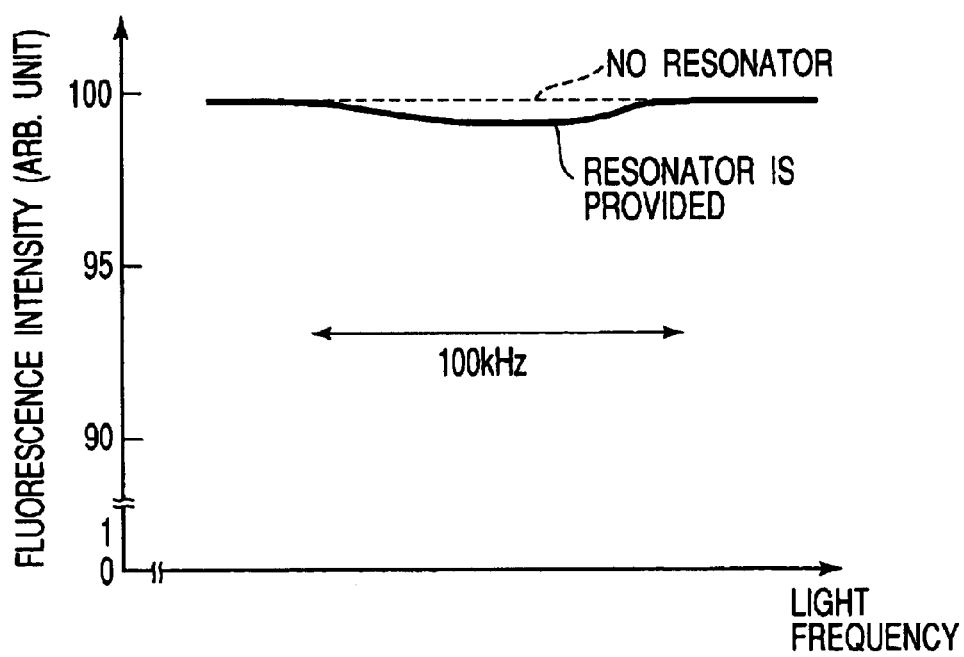
FIG. 12 is a diagram showing fluorescence excitation spectrum of $Pr^{3+}:Y_2SiO_5$ in a resonator in the embodiment 2 of the present invention.

As the sample 11, a $Y_2SiO_5$ crystal of 2 mm×2 mm×2 mm in which 0.05% of $Pr^{3+}$ ions are dispersed is prepared. The sample 11 is placed in the resonator 13 in the cryostat 10, and the temperature is kept at 1.4K. First, the wavelength of the laser beam A from the ring-dye laser is set to $v_A$ near 605.98 nm (16502.3 cm$^{-1}$) that resonates with the transition between the lowest $^3H_4(1)$ level and the $^1D_2(1)$ electron excitation level of $Pr^{3+}$ in the sample 11. The sample 11 is irradiated with the laser beam and then the fluorescence excitation spectrum emitted from the sample is measured by means of the photodetector 14. For the purpose of comparison, the sample 11, under the condition that the resonator is not provided, is irradiated with the laser beam having same wavelength as above and then the fluorescence excitation spectrum emitted from the sample is measured by means of the photodetector 14. As shown in FIG. 12, in the case where the resonator is provided, a depression appears in the fluorescence intensity in the spectrum over a frequency range of approximately 100 kHz in comparison with the case where the resonator is not provided. This is because a part of ions concerned in absorption are subjected to population trapping due to the resonator mode and irradiated laser beam and therefore the number of ions to be excited is reduced.

Next, a case where the controlled-NOT operation is performed using a k-th quantum bit $Q_k$ is used as a control bit and a l-th quantum bit $Q_l$ is used as a target bit will be described below. The states used in the following operations are described with reference to FIG. 13. For the k-th qubit $Q_k$, the lower two levels of the hyperfine structure are referred to as $|a>_k$ and $|b>_k$, respectively, and the upper level is referred to as $|e>_k$. The difference in frequency between $|a>_k$ and $|b>_k$ is 17.3 MHz. When a static magnetic field is applied to the sample, the degeneracy is broken for each of above lower two levels, and the split states are referred to as $|a+>_k$, $|a->_k$, $|b+>_k$ and $|b->_k$, respectively. The difference in frequency between $|a+>_k$ and $|a->_k$ is 5 MHz. As described later, $|a+>_k=|0>_k$ and $|a->_k=|1>_k$. Likewise, for the l-th qubit $Q_l$, the lower two levels of the hyperfine structure are referred to as $|a>_l$ and $|b>_l$, respectively, and the upper level is referred to as $|e>_l$. $|e>_l$ is higher in energy by 100 kHz than $|e>_k$. Like the k-th qubit $Q_k$, the split states generated when the degeneracy is broken for each of above lower two levels of the l-th qubit $Q_l$ are referred to as $|a+>_l$, $|a->_l$, $|b+>_l$ and $|b->_l$, respectively. Further, the $|b>_k-|e>_k$ transition and the $|b>_l-|e>_l$ transition are coupled through a common resonator mode.

(i) A case where an initial state is set to $|0>_k|0>_l$ and the a controlled-NOT operation is performed will be described.

An input operation is performed for the k-th qubit as follows, thereby setting an initial state. A laser beam k whose frequency is fixed at $v_k$ near the wave number of 16502.3 cm$^{-1}$ and a laser beam k' whose frequency is lower than that of the former laser beam by 17.3 MHz ($v_{k'}=v_k-17.3$ MHz) are used, and the laser beam k and laser beam k' are applied to the sample with the intensity (5 W/cm$^2$) of the laser beam k' set to 100 times the intensity (50 mW/cm$^2$) of the laser beam k, thereby transferring the state to $|a>_k$. A static magnetic field is applied to the sample for breaking the degeneracy of each of the levels of the hyperfine structure to split the levels by 5 MHz, and further two laser beams having frequencies of $v_k(1)=v_k-2.5$ MHz and $v_k(2)=v_k+2.5$ MHz, respectively, are applied to the sample with adjusted intensities, thereby transferring the state to $|a+>_k$. The state is called $1^0>_k$. Also, the state $|a->_k$ is called $|1>_k$. Thereafter, application of the magnetic field is stopped.

An input operation is performed for the l-th qubit as follows, thereby setting an initial-state. A laser beam l whose frequency $v_l$ is higher by 100 kHz than that of $v_k$ ($v_l=v_k+100$ kHz) and a laser beam l' having a frequency $v_{l'}$ ($v_{l'}=v_l-17.3$ MHz) are applied to the sample, thereby transferring the state to $|a>_l$. A static magnetic field is applied to the sample for breaking the degeneracy of each of the levels of the hyperfine structure to split the levels by 5 MHz, and further two laser beams having frequencies of $v_k(1)=v_k-2.5$ MHz and $v_k(2)=v_k+2.5$ MHz, respectively, are applied to the sample with adjusted intensities, thereby transferring the state to $|a+>_l$. The state is called $|0>1$. Also, the state $|a->_l$ is called $|1>1$. Thereafter, application of the magnetic field is stopped.

In such a manner as described above, the initial state $|0>_k|0>_l$ is prepared.

Figure 14:
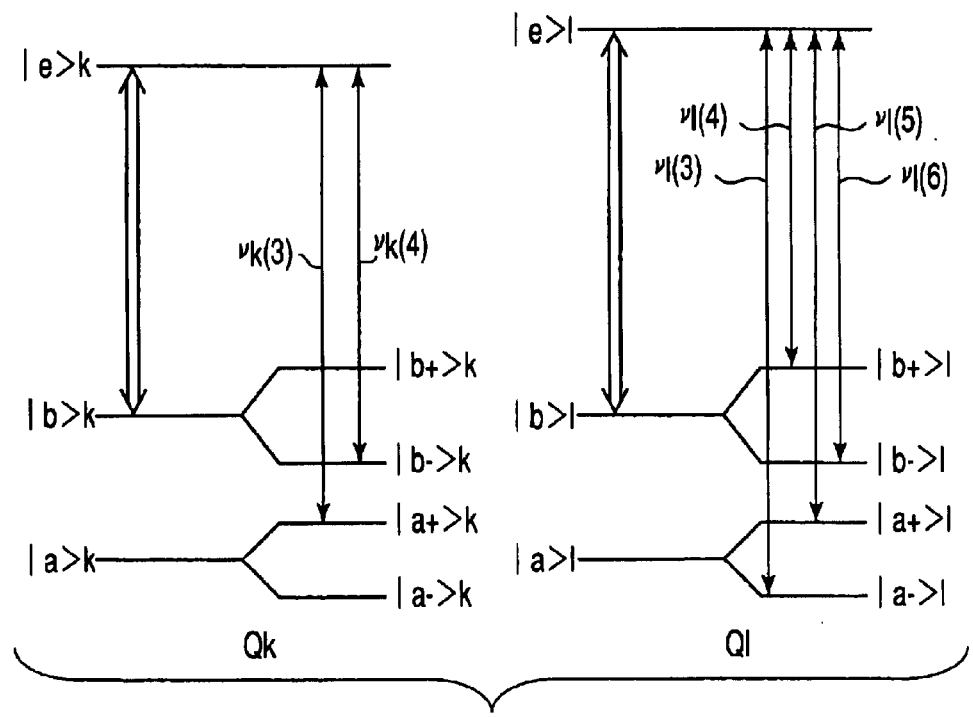
FIG. 14 is a view illustrating light beams used in the controlled-NOT operation in the embodiment 2 of the present invention.

(i-1) A static magnetic field is applied to the sample, and three combinations of laser beams shown in FIG. 14 are applied subsequently to the sample with adjusted intensities, thereby performing adiabatic passage three times. As shown in the figure, the combination of $v_k(3)$ and $v_k(4)$, the combination of $v_l(3)$ and $v_l(4)$, and the combination of $v_l(5)$ and $v_l(6)$ are used as two kinds of light to perform respective operations. These operations are intended to transfer the state from $|a+>_k=|0>_k$ to $|b->_k$, to transfer the state from $|a->_l=1>_l$ to $|b+>_l$, and to transfer the state from $|a+>_l=0>_l$ to $|b->_l$, respectively. That is, operations are performed to transfer the state from a level not resonant with the resonator mode to a level resonant with the resonator mode in each qubit. When the initial state is $|0>_k|0>_l$ as above, in the qubit $Q_k$, the transfer of state from $|a+>_k=|0>_k$ to $|b->_k$ occurs, and in the qubit $Q_l$, the transfer of state from $|a+>_l=|0>_l$ to $|b->_l$ occurs but the transfer of state from $|a->_l=|1>_l$ to $|b+>_l$ does not occur.

Figure 13:
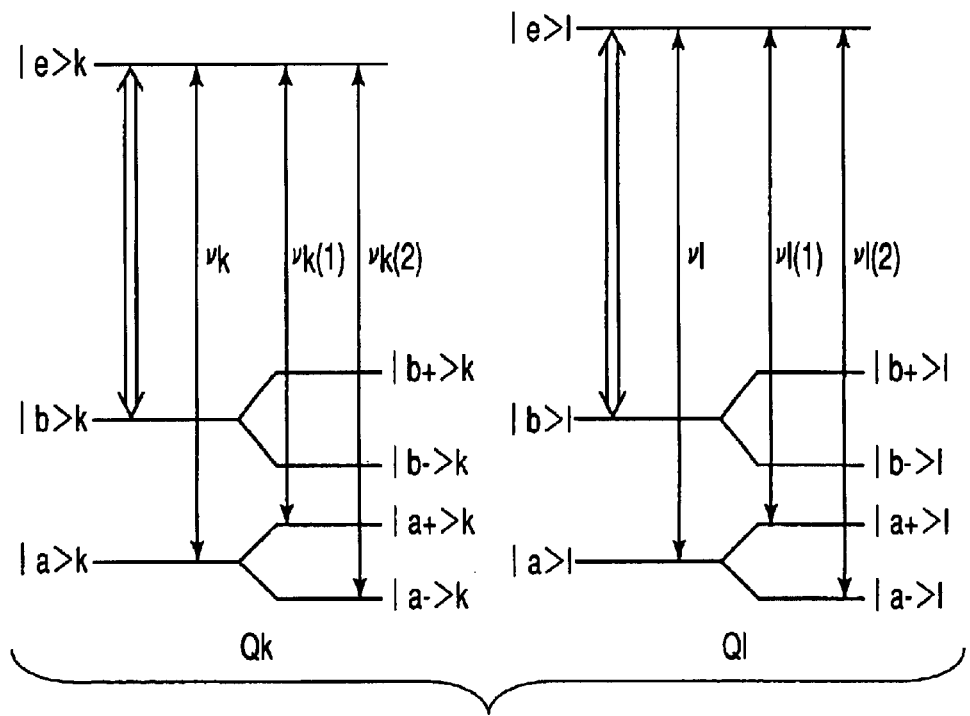
FIG. 13 is a view illustrating light beams used in the controlled-NOT operation in the embodiment 2 of the present invention.
Figure 16:
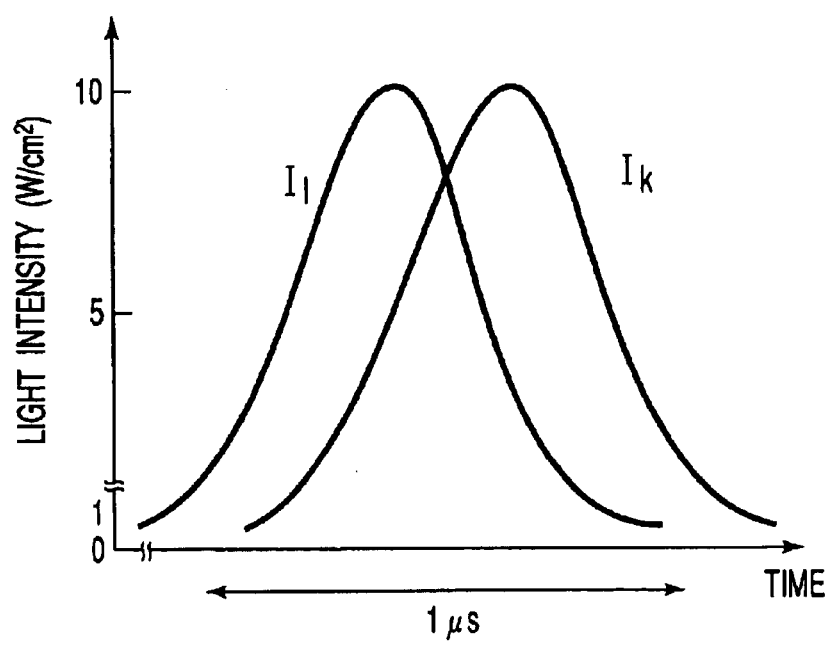
FIG. 16 is a diagram showing changes in intensity with time of two kinds of light used in the gate operation in the embodiment 2 of the present invention.

(i-2) Adiabatic passage is performed by applying simultaneously the laser beam k and laser beam l shown in FIG. 13 to the sample, thereby exchanging states between the qubit $Q_k$ and the qubit $Q_l$. At this time, the intensity of the laser beam k is set to $I_k$ and the intensity of the laser beam l is set to $I_l$. As shown in FIG. 16, the laser beam k and laser beam l are applied to the sample in such a manner that the intensities are initially set to $I_k<<I_l$ and the intensities are changed to $I_l<<I_k$ after approximately 1 µs. This operation causes a change of states $|a>_k|b>_l \to |b>_k|a>_l$.

Figure 15:
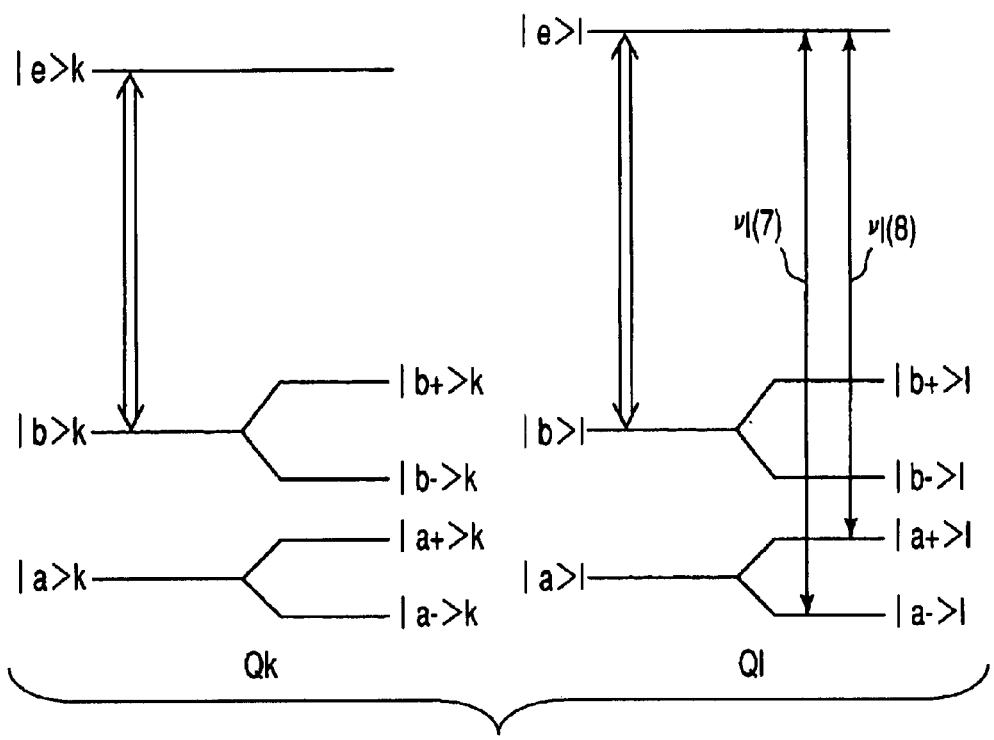
FIG. 15 is a view illustrating light beams used in the controlled-NOT operation in the embodiment 2 of the present invention.

(i-3) A static magnetic field and a vibrating magnetic field are applied to the sample, and at the same time two laser beams of $v_l(7)$ and $v_l(8)$ shown in FIG. 15 are applied to the sample with adjusted intensities. This operation is intended to exchange the states between $|a->_l$ and $|a+>_l$ in the qubit $Q_l$.

(i-4) The laser beam k and laser beam l are applied again to the sample in such a manner that, inversely to (i-2), the intensities are initially set to $I_l<<I_k$ and the intensities are changed to $I_k<<I_l$ after approximately 1 µs to exchange the states between the qubit $Q_l$ and qubit $Q_k$. This operation causes a change of states $|b>_k|a>_l \to |a>_k|b>_l$.

(i-5) A static magnetic field is applied to the sample, and three combinations of laser beams shown in FIG. 14 are applied subsequently to the sample with adjusted intensities, thereby performing adiabatic passage three times. These operations are intended to transfer the state from $|b->_k$ to $|a+>_k=|0>_k$, to transfer the state from $|b+>_l$ to $|a->_l=|1>_l$, and to transfer the state from $|b->_l$ to $|a+>_l=|0>_l$, respectively. That is, inversely to the operations in (i-1), operations are performed to transfer the state from a level resonant with the resonator mode to a level not resonant with the resonator mode in each qubit. In this case, in the qubit $Q_k$, the transfer of state from $|b->_k$ to $|a+>_k=|0>_k$ occurs, and in the qubit $Q_l$, the transfer of state from $|b->_l$ to $|a+>_l=|0>_l$ occurs but the transfer of state from $|b+>_l$ to $|a->_l=|1>_l$ does not occur.

(i-6) A static magnetic field is applied to the sample to break degeneracy by 5 MHz, and a laser beam of $v_l-2.5$ MHz is applied to the sample and then the intensity of emission from the sample is measured in order to examine which levels split by the application of the static magnetic field the l-th qubit $Q_l$ is set. As a result, it is found that the state is $|0>_l$. Also, when the state k-th qubit $Q_k$ is examined, it is found that the state remains $|0>_k$ same as the initial state.

(ii) A case where an initial state is set to $|0>_k|1>_l$ and the a controlled-NOT operation is performed will be described.

The laser beam k having a frequency of $v_k$ and the laser beam k' having a frequency of $v_k'$ are applied to the sample with adjusted intensities, thereby transferring the state of the k-th qubit $Q_k$ to $|a>_k$. A static magnetic field is applied to the sample for breaking the degeneracy of each of the levels of the hyperfine structure to split the levels by 5 MHz, and further two laser beams having frequencies of $v_k(1)$ and $v_k(2)$, respectively, are applied to the sample with adjusted intensities, thereby transferring the state the k-th qubit $Q_k$ to $|a+>_k=|0>_k$. Thereafter, application of the magnetic field is stopped. The laser beam l having a frequency of $v_l$ and the laser beam l' having a frequency of $v_l'$ are applied to the sample with adjusted intensities, thereby transferring the state of the l-th qubit $Q_l$ to $|a>_l$. A static magnetic field is applied to the sample for breaking the degeneracy of each of the levels of the hyperfine structure to split the levels by 5 MHz, and further two laser beams having frequencies of $v_l(1)$ and $v_1(2)$, respectively, are applied to the sample with adjusted intensities, thereby transferring the state the l-th qubit $Q_l$ to $|a->_l=|1>_l$. Thereafter, application of the magnetic field is stopped. In such a manner, the initial state $|0>_k|1>_l$ is prepared.

(ii-1) A static magnetic field is applied to the sample, and three combinations of laser beams shown in FIG. 14 are applied subsequently to the sample with adjusted intensities, thereby performing adiabatic passage three times. When the initial state is $|0>_k|1>_l$ as above, in the qubit $Q_k$, the transfer of state from $|a+>_k=|0>_k$ to $|b->_k$ occurs, and in the qubit $Q_l$, the transfer of state from $|a->_l=|1>_l$ to $|b+>_l$ occurs but the transfer of state from $|a+>_l=|0>_l$ to $|b->_l$ does not occur.

(ii-2) Adiabatic passage is performed by applying simultaneously the laser beam k and laser beam l to the sample, with changing intensities thereof as shown in FIG. 16. Thus, the operation to exchange the states between the qubit $Q_k$ and qubit $Q_l$ is performed.

(ii-3) A static magnetic field and a vibrating magnetic field are applied to the sample, and at the same time two laser beams of $v_l(7)$ and $v_l(8)$ shown in FIG. 15 are applied to the sample with adjusted intensities. Thus, the operation to exchange the states between $|a->_l$ and $|a+>_l$ in the qubit $Q_l$ is performed.

(ii-4) The laser beam k and laser beam l are applied again to the sample in such a manner that, inversely to (ii-2), the intensities are initially set to $I_l<<I_k$ and the intensities are changed to $I_k<<I_l$ after approximately 1 μs to exchange the states between the qubit $Q_l$ and qubit $Q_k$. Thus, the operation to exchange the states between the qubit $Q_l$ and qubit $Q_k$ is performed.

(ii-5) A static magnetic field is applied to the sample, and three combinations of laser beams shown in FIG. 14 are applied subsequently to the sample with adjusted intensities, thereby performing adiabatic passage three times. In this case, in the qubit $Q_k$, the transfer of state from $|b->_k$ to $|a+>_k=|0>_k$ occurs, and in the qubit $Q_l$, the transfer of state from $|b+>_l$ to $|a->_l=|1>_l$ occurs but the transfer of state from $|b->_l$ to $|a+>_l=|0>_l$ does not occur.

(ii-6) A static magnetic field is applied to the sample to break degeneracy by 5 MHz, and a laser beam of $v_l$–2.5 MHz is applied to the sample and then the intensity of emission from the sample is measured in order to examine which levels split by the application of the static magnetic field the l-th qubit $Q_l$ is set. As a result, it is found that the state is $|1>_l$. Also, when the state k-th qubit $Q_k$ is examined, it is found that the state remains $|0>_k$ same as the initial state.

(iii) A case where an initial state is set to $|1>_k|0>_l$ and the a controlled-NOT operation is performed will be described.

The laser beam k having a frequency of $v_k$ and the laser beam k' having a frequency of $v_k'$ are applied to the sample with adjusted intensities, thereby transferring the state of the k-th qubit $Q_k$ to $|a>_k$. A static magnetic field is applied to the sample for breaking the degeneracy of each of the levels of the hyperfine structure to split the levels by 5 MHz, and further two laser beams having frequencies of $v_k(1)$ and $v_k(2)$, respectively, are applied to the sample with adjusted intensities, thereby transferring the state the k-th qubit $Q_k$ to $|a->_k=|1>_k$. Thereafter, application of the magnetic field is stopped. The laser beam l having a frequency of $v_l$ and the laser beam l' having a frequency of $v_l'$ are applied to the sample with adjusted intensities, thereby transferring the state of the l-th qubit $Q_l$ to $|a>_l$. A static magnetic field is applied to the sample for breaking the degeneracy of each of the levels of the hyperfine structure to split the levels by 5 MHz, and further two laser beams having frequencies of $v_l(1)$ and $v_l(2)$, respectively, are applied to the sample with adjusted intensities, thereby transferring the state the l-th qubit $Q_l$ to $|a+>_l=|0>_l$. Thereafter, application of the magnetic field is stopped. In such a manner, the initial state $|1>_k|0>_l$ is prepared.

(iii-1) A static magnetic field is applied to the sample, and three combinations of laser beams shown in FIG. 14 are applied subsequently to the sample with adjusted intensities, thereby performing adiabatic passage three times. When the initial state is $|1>_k|0>_l$ as above, in the qubit $Q_k$, the transfer of state from $|a+>_k=|0>_k$ to $|b->_k$ does not occur, and in the qubit $Q_l$, the transfer of state from $|a+>_l=|0>_l$ to $|b->_l$ occurs but the transfer of state from $|a->_l=|1>_l$ to $|b+>_l$ does not occur.

(iii-2) Adiabatic passage is performed by applying simultaneously the laser beam k and laser beam l to the sample, with changing intensities thereof as shown in FIG. 16. Thus, the operation to exchange the states between the qubit $Q_k$ and qubit $Q_l$ is performed, and the change of states $|a>_k|b>_l \rightarrow |b>_k|a>_l$ occurs.

(iii-3) A static magnetic field and a vibrating magnetic field are applied to the sample, and at the same time two laser beams of $v_l(7)$ and $v_l(8)$ shown in FIG. 15 are applied to the sample with adjusted intensities. Thus, the operation to exchange the states between $|a->_l$ and $|a+>_l$ in the qubit $Q_l$ is performed.

(iii-4) The laser beam k and laser beam l are applied again to the sample in such a manner that, inversely to (iii-2), the intensities are initially set to $I_l<<I_k$ and the intensities are changed to $I_k<<I_l$ after approximately 1 μs to exchange the states between the qubit $Q_l$ and qubit $Q_k$. Thus, the operation to exchange the states between the qubit $Q_l$ and qubit $Q_k$ is performed, and the change of states $|b>_k|a>_l \rightarrow |a>_k|b>_l$ occurs.

(iii-5) A static magnetic field is applied to the sample, and three combinations of laser beams shown in FIG. 14 are applied subsequently to the sample with adjusted intensities, thereby performing adiabatic passage three times. In this case, in the qubit $Q_k$, the transfer of state from $|b->_k$ to $|a+>_k=|0>_k$ does not occur, and in the qubit $Q_l$ the transfer of state from $|b+>_l$ to $|a->_l=|1>_l$ occurs but the transfer of state from $|b->_l$ to $|a+>_l=|0>_l$ does not occur.

(iii-6) A static magnetic field is applied to the sample to break degeneracy by 5 MHz, and a laser beam of $v_l$–2.5

MHz is applied to the sample and then the intensity of emission from the sample is measured in order to examine which levels split by the application of the static magnetic field the l-th qubit $Q_l$ is set. As a result, it is found that the state is $|1>_l$. Also, when the state k-th qubit $Q_k$ is examined, it is found that the state remains $|1>_k$ same as the initial state.

(vi) A case where an initial state is set to $|1>_k|1>_l$ and the a controlled-NOT operation is performed will be described.

The laser beam k having a frequency of $v_k$ and the laser beam k' having a frequency of $v_k{'}$ are applied to the sample with adjusted intensities, thereby transferring the state of the k-th qubit $Q_k$ to $|a>_k$. A static magnetic field is applied to the sample for breaking the degeneracy of each of the levels of the hyperfine structure to split the levels by 5 MHz, and further two laser beams having frequencies of $v_k(1)$ and $v_k(2)$, respectively, are applied to the sample with adjusted intensities, thereby transferring the state the k-th qubit $Q_k$ to $|a->_k=|1>_k$. Thereafter, application of the magnetic field is stopped. The laser beam l having a frequency of $v_l$ and the laser beam l' having a frequency of $v_l{'}$ are applied to the sample with adjusted intensities, thereby transferring the state of the l-th qubit $Q_l$ to $|a>_l$. A static magnetic field is applied to the sample for breaking the degeneracy of each of the levels of the hyperfine structure to split the levels by 5 MHz, and further two laser beams having frequencies of $v_l(1)$ and $v_l(2)$, respectively, are applied to the sample with adjusted intensities, thereby transferring the state the l-th qubit $Q_l$ to $|a->_l=|1>_l$. Thereafter, application of the magnetic field is stopped. In such a manner, the initial state $|1>_k|1>_l$ is prepared.

(iv-1) A static magnetic field is applied to the sample, and three combinations of laser beams shown in FIG. 14 are applied subsequently to the sample with adjusted intensities, thereby performing adiabatic passage three times when the initial state is $|1>_k|1>_l$ as above, in the qubit $Q_k$, the transfer of state from $|a+>_k=|0>_k$ to $|b->_k$ does not occur, and in the qubit $Q_l$, the transfer of state from $|a->_l=|1>_l$ to $|b+>_l$ occurs but the transfer of state from $|a+>_l=|0>_l$ to $|b->_l$ does not occur.

(iv-2) Adiabatic passage is performed by applying simultaneously the laser beam k and laser beam l to the sample, with changing intensities thereof as shown in FIG. 16. Thus, the operation to exchange the states between the qubit $Q_k$ and qubit $Q_l$ is performed, and the change of states $|a>_k|b>_l \rightarrow |b>_k|a>_l$ occurs.

(iv-3) A static magnetic field and a vibrating magnetic field are applied to the sample, and at the same time two laser beams of $v_l(7)$ and $v_l(8)$ shown in FIG. 15 are applied to the sample with adjusted intensities. Thus, the operation to exchange the states between $|a->_l$ and $|a+>_l$ in the qubit $Q_l$ is performed.

(iv-4) The laser beam k and laser beam l are applied again to the sample in such a manner that, inversely to (iv-2), the intensities are initially set to $I_l<<I_k$ and the intensities are changed to $I_k<<I_l$ after approximately 1 $\mu$s to exchange the states between the qubit $Q_l$ and qubit $Q_k$. Thus, the operation to exchange the states between the qubit $Q_l$ and qubit $Q_k$ is performed, and the change of states (iv-5) A static magnetic field is applied to the sample, and three combinations of laser beams shown in FIG. 14 are applied subsequently to the sample with adjusted intensities, thereby performing adiabatic passage three times. In this case, in the qubit $Q_k$, the transfer of state from $|b->_k$ to $|a+>_k=|0>_k$ does not occur, and in the qubit $Q_l$, the transfer of state from $|b->_l$ to $|a+>_l=|0>_l$ occurs but the transfer of state from $|b+>_l$ to $|a->_l=|1>_l$ does not occur.

(iv-6) A static magnetic field is applied to the sample to break degeneracy by 5 MHz, and a laser beam of $v_l-2.5$ MHz is applied to the sample and then the intensity of emission from the sample is measured in order to examine which levels split by the application of the static magnetic field the l-th qubit $Q_l$ is set. As a result, it is found that the state is $|0>_l$. Also, when the state k-th qubit $Q_k$ is examined, it is found that the state remains $|1>_k$ same as the initial state.

As described above, when the initial state is $|0>_k|0>_l$, the final state is $|0>_k|0>_l$, when the initial state is $|0>_k|1>_l$, the final state is $|0>_k|1>_l$, when the initial state is $|1>_k|0>_l$, the final state is $|1>_k|1>_l$, when the initial state is $|1>_k|1>_l$, the final state is $|1>_k|0>_l$, and thus the controlled-NOT operation can be realized.

Further, by performing the operations similar those described above, the quantum computation using three or more qubits can be realized.

Embodiment 3

A $Y_2SiO_5$ crystal containing $Pr^{3+}$ is formed into a thin plate of 2 mm×22 mm×0.5 mm and dielectric multi-layered coatings are applied to opposite surfaces thereof to form a resonator. The multi-layered coatings are formed to realize a high reflectance in a narrow bandwidth around $v_A$ (near 605.98 nm). The resonator 13 provided outside the cryostat is omitted, and the laser beam is applied to the sample and then the fluorescence excitation spectrum is measured like the embodiment 2. As a result, a depression appears in the fluorescence intensity in the spectrum over a frequency range of approximately 100 kHz in comparison with the case where the resonator is not provided. In this case, reduction in the fluorescence intensity is several ten times that in a case where the resonator 13 is provided outside the cryostat. It is considered that this is because the volume of the resonator is reduced and the coefficient of coupling with the resonator mode is increased. Also, in this case, the controlled-NOT operation same as in the embodiment 2 can be realized.

Embodiment 4

As a sample, a $Y_2SiO_5$ crystal of 2 mm×2 mm×2 mm in which 0.02% of $Pr^{3+}$ ions are dispersed is prepared. The sample is held in a cryostat and the temperature is kept at 1.4K. A resonator is provided outside the cryostat. Further, a photodetector for detecting light emitted from the sample when the laser beam is applied thereto is disposed outside the cryostat.

In this embodiment, five qubits having the following transition frequencies are assumed, and the first and third qubits are subjected to gate operations.

$(v_{0e,q,1}=v_{0e,q,3}, v_{1e,q,1}=v_{1e,q,3}+40$ kHz$)$ $(v_{0e,q,2}=v_{0e,q,3}, v_{1e,q,2}=v_{1e,q,3}+20$ kHz$)$ $(v_{0e,q,3}, v_{1e,q,3})$ $(v_{0e,q,4}=v_{0e,q,3}, v_{1e,q,4}=v_{1e,q,3}-20$ kHz$)$ $(v_{0e,q,5}=v_{0e,q,3}, v_{1e,q,5}=v_{1e,q,3}-40$ kHz$)$

The wavelength of the laser beam A from the ring-dye laser is set to $v_{0e,q,3}$ near 605.98 nm (16502.3 $cm^{-1}$) that resonates with the transition between the lowest $^3H_4(1)$ level and the $^1D_2(1)$ electron excitation level of $Pr^{3+}$ in the sample. The frequency $v_{0e,q,3}$ resonates with a common resonator mode. In addition, laser beam B having a frequency of $v_{1e,q,3}=v_{0e,q,3}-17.3$ MHz is generated by passing the above laser beam through the acoustooptic device.

In the light source used in this embodiment, a mechanism for applying the laser beam B while scanning the frequency for preprocessing is provided. The frequency scanning range is set so as not to exceed a value obtained by subtracting, from the hyperfine structure splitting 17.3 MHz of the $Pr^{3+}$ ion expressing the qubits $|0>$ and $|1>$, a half of an inhomogeneous width 70 kHz between the two levels, i.e., 17.3 MHz–70 kHz/2. The laser beam B is applied to the sample for preprocessing with scanning the frequency from $(v_1e,q,3_{-1}$ MHz) to $(v_{1e,q,3}+1$ MHz).

Figure 17:
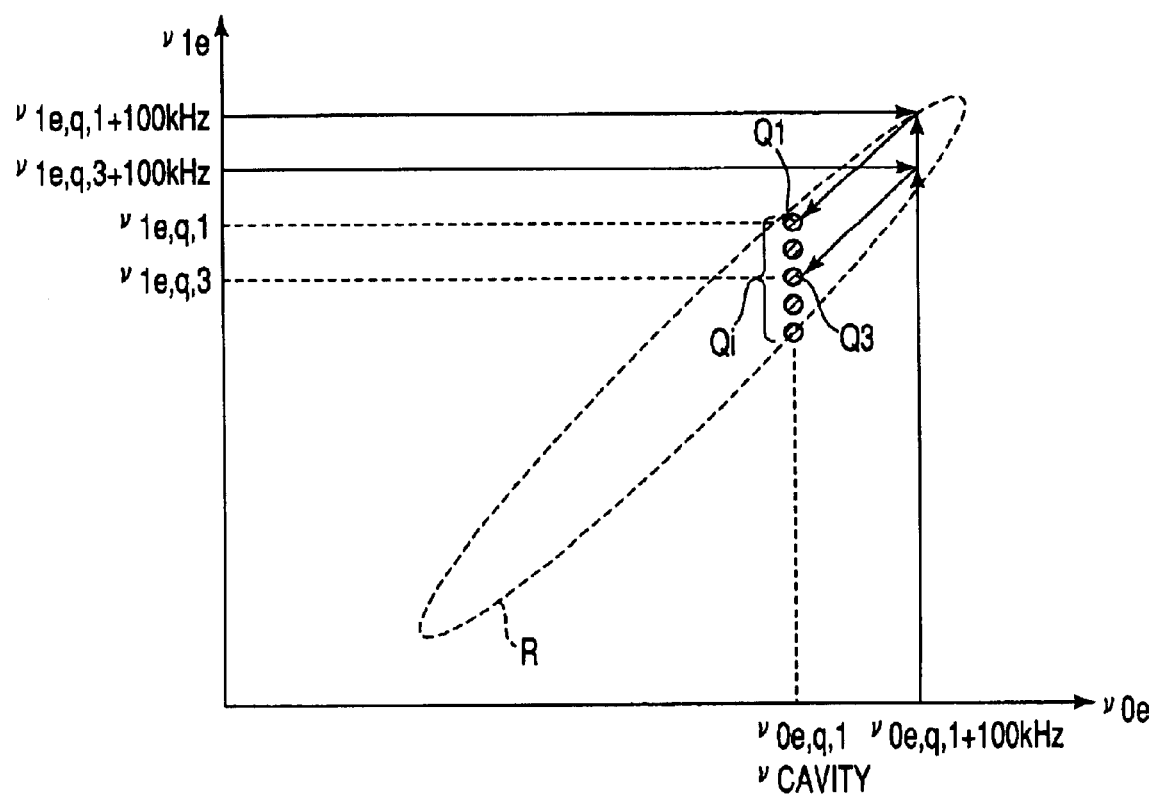
FIG. 17 is a diagram showing the relation between the transition frequency of the qubit, the frequency of irradiated light and the resonator mode in the embodiment 4 of the present invention.

Next, the following operation is effected by using two kinds of light that make one-photon resonant with neither the $|0>-|e>$ transition nor the $|1>-|e>$ transition but make two-photon resonant with the $|0>-|1>$ transition. FIG. 17 shows the relation between qubits used for the gate operation, other qubits, the frequency of irradiated light and the resonator mode. In this figure, the first to fifth qubits are depicted in this order from the top to the bottom.

First, the laser beam A is set to have a frequency of $(v_{0e,q,1}+100$ kHz) and an intensity of 5 $W/cm^2$, the laser beam B is set to have a frequency of $(v_{1e,q,1}+100$ kHz) and an intensity of 50 $mW/cm^2$, and they are applied to the sample for 0.1 seconds or more to transfer the state of the first qubit to $|0>$. Next, the laser beam A is set to have a frequency of $(v_{0e,q,3}+100$ kHz) and an intensity of 50 $mw/cm^2$, the laser beam B is set to have a frequency of $(v_{1e,q,3}+100$ kHz) and an intensity of 5 $W/cm^2$, and they are applied to the sample for 0.1 seconds or more to transfer the state of the third qubit to $|1>$.

Thereafter, the laser beam B set to have an frequency $v_{1e,q,1}$ is applied to the sample and emission from the sample is observed. Further, the laser beam B set to have a frequency of $v_{1e,q,3}$ is applied to the sample and emission from the sample is observed. As the result, the emission intensity when the laser beam of $v_{1e,q,3}$ is applied is four times the emission intensity when the laser beam of $v_{1e,q,1}$ is applied. From this result, it is understood that the first qubit is in the state $|0>$ with the amplitude probability of approximately 90% and the third qubit a is in the state $|1>$ with the amplitude probability of approximately 90%.

When the same operation is effected for other qubits, the same results are obtained. That is, if a gate operation is performed by two-photon resonance using two kinds of light not one-photon resonant with the optically allowed transition, it makes possible to avoid the influence of irradiated light to other qubits that are not intended for the gate operation. Further, by performing preprocessing using the laser beam B, it is possible to read out the qubit at a high precision in comparison with a case where preprocessing is not performed.

Embodiment 5

Like the embodiment 4, a $Y_2SiO_5$ crystal of 2 mm×2 mm×2 mm in which 0.02% of $Pr^{3+}$ ions are dispersed is prepared as a sample, the sample is placed in a cryostat and the temperature is kept at 1.4K. A resonator is provided outside the cryostat. Further, a photodetector for detecting emission from the sample when the laser beam B is applied thereto is disposed outside the cryostat.

Also in this embodiment, as qubits for effecting the gate operations, five qubits are considered like the case of the embodiment 4 (the transition frequencies of these qubits are described in the embodiment 4). The wavelength of the laser beam A from the ring-dye laser is set to $v_{0e,q,3}$ near 605.98 nm (16502.3 $cm^{-1}$) that resonates with the transition between the lowest $^3H_4(1)$ level and the $^1D_2(1)$ electron excitation level of $Pr^{3+}$ in the crystal. In addition, laser beam B having a frequency of $v_{1e,q,3}=v_{0e,q,3}31$ 17.3 MHz is generated by passing the above laser beam through the acoustooptic device.

Like the embodiment 4, in the light source, a mechanism for applying the laser beam B to the sample while scanning the frequency is provided for preprocessing. The frequency scanning range is set so as not to exceed a value obtained by subtracting, from the hyperfine structure splitting 17.3 MHz of the $Pr^{3+}$ ion expressing the qubits $|0>$ and $|1>$, a half of an inhomogeneous width 70 kHz between the two levels, i.e., 17.3 MHz–70 kHz/2. The laser beam B is applied to the sample for preprocessing with scanning the frequency from $(v_{1e,q,3}-1$ MHz) to $(v_{1e,q,3}+1$ MHz).

Next, gate operations similar to those in embodiment 2 are performed. In this embodiment, the first qubit is subjected to operations similar to those operations performed for the k-th qubit in embodiment 2 and the third qubit is subjected to operations similar to those operations performed for the l-th qubit in embodiment 2.

As a result, it is found that in the case where the first qubit is set to $|0>_1$, if the third qubit is initialized as $|0>_3$, the final state of the third qubit is $|0>_3$, and if the third qubit is initialized as $|1>_3$, the final state of the third qubit is $|1>_3$. On the other hand, it is found that in the case where the first qubit is set to $|1>_1$, if the third qubit is initialized as $|0>_3$, the final state of the third qubit is $|1>_3$, and if the third qubit is initialized as $|1>_3$, the final state of the third qubit is $|0>_3$.

In each of the above cases, no change is observed in the states of the ion (the first qubit) interacting with the laser beam $B_1$ having a frequency $v_{1e,q,1}$ between the initial state and the final state.

As described above, when the initial state is $|0>_1|0>_3$, the final state is $|0>_1|0>_3$, when the initial state is $|0>_1|1>_3$, the final state is $|0>_1|1>_3$, when the initial state is $|1>_1|0>_3$, the final state is $|1>_1|1>_3$, when the initial state is $|1>_1|1>_3$, the final state is $|1>_1|0>_3$, and thus the controlled-NOT operation can be realized.

Further, in the embodiment, since the preprocessing with scanning the frequency of light is effected and thus physical systems that are not utilized as qubits do not absorb light, influence from such physical systems can be suppressed. Therefore, in comparison with a case where the preprocessing is not effected, the operation stability is increased and the operation using light with relatively low intensity can be effected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for quantum information processing comprising:

providing physical systems arranged in a resonator, each physical system having three energy levels, two transitions of three transitions between the three levels being optically allowed, wherein a quantum bit of each physical system is expressed by either of quantum states of two levels constituting a remaining optically forbidden transition or by their superposition state, and wherein at least two physical systems are included, one transition of the optically allowed two transitions being different in transition frequency for respective physical systems, and the at least two physical systems being coupled quantum-mechanically through a common resonator mode;

irradiating one physical system selectively with two kinds of light, frequency difference thereof corresponding to a transition frequency of the optically forbidden transition of the physical system, thereby setting an initial state;

irradiating the other physical system selectively with two kinds of light, frequency difference thereof corresponding to a transition frequency of the optically forbidden transition of the other physical system, thereby setting an initial state; and irradiating the two physical systems simultaneously with two kinds of light, the two kinds of light having frequencies resonant with the optically allowed transitions other than the transitions coupled through the common resonator mode, while increasing an intensity level of one of the two kinds of light and decreasing an intensity level of the other light between start time and finish time of the simultaneous irradiation, thereby exchanging the quantum states between the two physical systems.

2. The method according to claim 1, wherein the physical systems are held in a solid substance, and wherein one transition of optically allowed two transitions is different in transition frequency for respective physical systems according to a surrounding local field.

3. The method according to claim 1, wherein the physical systems consist of ions contained in a solid substance, and wherein two of the three energy levels of each physical system are neighboring two levels generated by hyperfine structure splitting due to the nuclear spin of the ion.

4. The method according to claim 1, wherein the physical systems include a plurality of physical system groups, each group including a plurality of physical systems whose transition frequencies are in a given range, and wherein the quantum states of the plurality of physical systems contained in each group are collectively changed.

5. The method according to claim 1, wherein the resonator is constituted by the surfaces of a solid substance containing the physical systems.

6. The method according to claim 1, wherein the states of the three energy levels of each physical system are set to $|0>$, $|1>$, and $|e>$ in order from a lowest energy level, the $|0>-|e>$ transition and the $|1>-|e>$ transition being optically allowed, and wherein a quantum bit is expressed by the state $|0>$, the state $|1>$, or a superposition state thereof, the method further comprising:

in the case where the $|0>-|e>$ transitions of respective physical systems are coupled through a common resonator mode, irradiating the physical systems with light of a frequency resonant with the $|1>-|e>$ transitions while scanning the frequency thereof in a range in which transition frequencies of the $|1>-|e>$ transitions of the physical systems are distributed, thereby effecting preprocessing for information processing; and in the case where the $|1>-|e>$ transitions of respective physical systems are coupled through a common resonator mode, irradiating the physical systems with light of a frequency resonant with the $|0>-|e>$ transitions while scanning the frequency thereof in a range in which transition frequencies of the $|0>-|e>$ transitions of the physical systems are distributed, thereby effecting preprocessing for information processing.

7. The method according to claim 6, wherein assuming that a scanning range of a light frequency irradiated for the preprocessing is $\Delta v_{Bw}$, a central transition frequency of the $|0>-|1>$ transitions is $v_{01center}$, and an inhomogeneous width of the $|0>-|1>$ transitions is $\Delta v_{01inhomo}$, $\Delta v_{Bw}$ is set smaller than a value obtained by subtracting half of $\Delta v_{01inhomo}$ from $\Delta v_{01inhomo}$.

8. The method according to claim 1, wherein the physical systems are applied with a magnetic field or an electric field together with irradiation with light, and wherein levels subjected to splitting by breaking degeneracy of the two levels constituting the optically forbidden transition are utilized.

9. The method according to claim 1, wherein the information processing is a controlled-NOT operation.

10. The method according to claim 1, wherein computation is executed by combining the controlled-NOT operation and a one-quantum bit operation.

11. The method according to claim 10, wherein the one-quantum bit operation is performed by irradiating a physical system in a solid substance intended to change a quantum state with two kinds of light that resonate with optically allowed two transitions of the physical system, respectively.

12. The method according to claim 10, wherein the one-quantum bit operation is performed by irradiating a physical system in a solid substance intended to change a quantum state with two kinds of light that do not resonate with any of optically allowed two transitions of the physical system but two-photon resonate with a remaining optically forbidden transition.

13. The method according to claim 12, wherein the physical systems are irradiated with light resonant with one of the optically allowed two transitions, which does not resonate with the resonator mode, with scanning the frequency thereof, and emissions from the physical systems are detected, thereby reading-out the quantum states of respective physical systems.

14. A quantum information processor, comprising:

physical systems each having three energy levels, two transitions of three transitions between the three levels being optically allowed, wherein a quantum bit of each physical system is expressed by either of quantum states of two levels comprising a remaining optically forbidden transition or by a superposition state thereof, and wherein at least two physical systems are included, one transition of the optically allowed two transitions being different in transition frequency for respective physical systems, with the other transition of the optically allowed two transitions being common in transition frequency for the respective physical systems;

a resonator provided around the physical systems and having a resonator mode that resonates with the transition common in transition frequency for the respective physical systems; and a light source and an optical system configured to irradiate the physical systems with two kinds of light.

15. The quantum information processor according to claim 14, further comprising an electromagnet for applying a magnetic field to the physical systems.

16. The quantum information processor according to claim 14, wherein the optical system is configured to divide light from the light source into a plurality of optical paths, and wherein each optical path is provided with an acoustooptic device configured to control a frequency of the light from the light source and an electro-optic device configured to generate a light pulse train.

17. The quantum information processor according to claim 14, wherein the light source and the optical system are configured to irradiate the physical systems with light while scanning the frequency thereof.

18. The quantum information processor according to claim 14, further comprising a photodetector configured to detect light emitted from the physical systems due to light irradiation to the physical systems.

19. The processor according to claim 14, wherein the two kinds of light have frequencies resonant with the optically allowed transitions other than the transitions coupled through the common resonator mode of selected two physical systems.

* * * * *